United States Patent
Okubo (12)

(10) Patent No.: US 11,431,274 B2
(45) Date of Patent: Aug. 30, 2022

(54) MOTOR CONTROL DEVICE AND FAILURE DETECTION METHOD FOR MOTOR CONTROL DEVICE

(71) Applicant: NSK LTD., Tokyo (JP)

(72) Inventor: Mitsunori Okubo, Maebashi (JP)

(73) Assignee: NSK LTD., Tokyo (JP)

( * ) Notice: Subject to any disclaimer, the term of this patent is extended or adjusted under 35 U.S.C. 154(b) by 99 days.

(21) Appl. No.: 16/981,808

(22) PCT Filed: Jan. 18, 2019

(86) PCT No.: PCT/JP2019/001548
§ 371 (c)(1),
(2) Date: Sep. 17, 2020

(87) PCT Pub. No.: WO2019/187529
PCT Pub. Date: Oct. 3, 2019

(65) Prior Publication Data
US 2021/0044245 A1    Feb. 11, 2021

(30) Foreign Application Priority Data

Mar. 29, 2018  (JP) .............................. JP2018-065955
Mar. 29, 2018  (JP) .............................. JP2018-065956
Mar. 29, 2018  (JP) .............................. JP2018-065957

(51) Int. Cl.
*H02P 1/04*        (2006.01)
*H02P 5/00*        (2016.01)
(Continued)

(52) U.S. Cl.
CPC .......... *H02P 29/028* (2013.01); *B62D 5/0463* (2013.01); *B62D 5/0481* (2013.01); *B62D 5/0484* (2013.01); *H02P 27/06* (2013.01)

(58) Field of Classification Search
CPC ...... H02P 29/08; B62D 5/0463; B62D 5/0484
(Continued)

(56) References Cited

U.S. PATENT DOCUMENTS

| 2011/0248657 A1 | 10/2011 | Endoh |
| 2014/0055059 A1 | 2/2014 | Uryu et al. |
| 2017/0297616 A1 | 10/2017 | Kikuchi |
| 2017/0331399 A1 | 11/2017 | Yamane et al. |

FOREIGN PATENT DOCUMENTS

| JP | 2011-223707 A | 11/2011 |
| JP | 2014-45576 A | 3/2014 |

(Continued)

OTHER PUBLICATIONS

European Search Report dated Feb. 23, 2021, issued by the European Patent Office in counterpart European patent Application No. 19776049.9.

(Continued)

*Primary Examiner* — Erick D Glass
(74) *Attorney, Agent, or Firm* — Sughrue Mion, PLLC

(57) ABSTRACT

A closed-loop circuit is detected based on a short-circuit failure of a motor control switching element of a motor drive circuit and a cutoff switching element. A motor control device including a motor, a motor drive circuit (10a) that is connected to a power supply device and the motor and controls the output of the motor, and a processing unit for detecting a closed-loop circuit formed by the motor and the motor drive circuit (10a) based on a short-circuit failure of switching elements arranged in the motor drive circuit (10a).

18 Claims, 13 Drawing Sheets

(51) Int. Cl.
    *H02P 7/00*          (2016.01)
    *H02P 29/028*      (2016.01)
    *B62D 5/04*          (2006.01)
    *H02P 27/06*        (2006.01)

(58) Field of Classification Search
    USPC ........................................................ 318/445
    See application file for complete search history.

(56) References Cited

FOREIGN PATENT DOCUMENTS

| JP | 6108043 B2 | 4/2017 |
| JP | 2017-93196 A | 5/2017 |
| JP | 2017-204942 A | 11/2017 |

OTHER PUBLICATIONS

Office Action dated Mar. 19, 2021, issued by the European Patent Office in counterpart European patent Application No. 19776049.9.
International Search Report dated Apr. 16, 2019 (PCT/ISA/210) issued by the International Searching Authority for International Application No. PCT/JP2019/001548.
Written Opinion dated Apr. 16, 2019 (PCT/ISA/237) issued by the International Searching Authority for International Application No. PCT/JP2019/001548.
International Preliminary Examination Report dated Mar. 2, 2020 (PCT/IPEA/409) issued by the International Searching Authority for International Application No. PCT/JP2019/001548.
Communication dated May 23, 2022 issued by the European Patent Office in counterpart European Application No. 19 776 049.9.

MOTOR CONTROL DEVICE AND FAILURE DETECTION METHOD FOR MOTOR CONTROL DEVICE

CROSS-REFERENCE TO RELATED APPLICATIONS

This application is a National Phase Entry of PCT International Application No. PCT/JP2019/001548, filed on Jan. 18, 2019, which claims priority to Japanese Patent Application No. 2018-065955 filed on Mar. 29, 2018, Japanese Patent Application No. 2018-065956 filed on Mar. 29, 2018, and Japanese Patent Application No. 2018-065957 filed on Mar. 29, 2018, the contents of all of which are incorporated herein by reference in their entirety.

TECHNICAL FIELD

The present invention relates to a motor control device and a failure detection method for the motor control device, and relates to, for example, an electric power steering apparatus that applies an assist force to a steering system of a vehicle, and a failure detection method for the electric power steering apparatus.

BACKGROUND ART

In the related art, an electric motor control device is known that controls a rotation state of a motor by turning on or off a switching element in a motor drive circuit connected to a three-phase motor.

The switching element in the motor drive circuit uses, for example, a MOSFET that is a kind of field-effect transistor, and is used to control the rotation of the motor that applies an assist force to a steering system of a vehicle by the switching control performed on a group of FETs including three upper FETs and three lower FETs. Here, "upper" means a side to which a high voltage (typically, battery voltage) is applied, and "lower" means a side to which a low voltage (typically, ground voltage) is applied.

And, for the failure of the FET of the motor drive circuit, the safety design is made in terms of both hardware and software sides. In particular, when a short-circuit failure of the FET (so-called arm short-circuit failure) occurs, if the safety design is insufficient, a large current will flow in the motor drive circuit, which causes a failure.

Therefore, in the electric motor control device disclosed in Patent Document 1, the simultaneous ON or OFF control of the upper FETs and the simultaneous ON or OFF control of the lower FETs in a plurality of phases of the motor drive circuit are individually carried out and the current value flowing in each phase at that time is detected. This current value is compared with a predetermined reference current value and the comparison result of the magnitude relation makes it possible to detect in which phase an arm short-circuit failure of the upper FET and the lower FET, which are a pair of the same phase, a short-circuit failure only in the upper FETs, or a short-circuit failure only in the lower FETs has occurred.

Further, in the power steering device disclosed in Patent Document 2, when driving a motor having a two-system motor drive circuit, a current flowing in each three-phase of the two-system motor drive circuit is detected. By using the two-system motor drive circuit, when a short-circuit failure of the coil winding of the motor is detected in one system, it is possible to drive the motor only with the other system, which is normal.

PRIOR ART DOCUMENT

Patent Document

Patent Document 1: JP-A 2011-223707
Patent Document 2: Japanese Patent No. 6108043

SUMMARY OF INVENTION

Technical Problem

However, in the above-described electric power steering apparatus of the related art, even though a short-circuit failure of the FET of the motor drive circuit or a short-circuit failure of the coil winding can be detected, it is not possible to detect a secondary failure in which the FET of the motor drive circuit and the FET of the motor cutoff circuit have a short-circuit failure at the same time to form a closed-loop that passes through the coil winding (hereinafter, when simply described as "secondary failure" in the present specification, it refers to a secondary failure forming a closed-loop as described above.).

If the closed-loop circuit is formed by a short-circuit failure of the FET in this way, the braking force is generated by the motor and the steering wheel becomes unsteerable, resulting in a significantly dangerous state.

In Patent Document 1, it is possible to identify which FET has a short-circuit failure with respect to the upper FETs and the lower FETs of the motor drive circuit and detect the arm short-circuit failure of the upper FET and the lower FET in the same phase. However, it is not possible to determine whether or not a closed-loop circuit is formed between the motor drive circuit and the motor by only detecting the short-circuit failure of one of the upper FETs and the lower FETs.

Further, even in the power steering apparatus of Patent Document 2, although a short-circuit failure of the coil winding can be detected, the secondary failure in which a short-circuit failure of either the upper FET or the lower FET and a short-circuit failure of the cutoff FET occur at the same time to form a closed-loop circuit cannot be specified and detected.

An object of the present invention is to provide a motor control device capable of detecting a secondary failure in which a short-circuit failure of an upper FET and a lower FET of a motor drive circuit in a power steering apparatus and a short-circuit failure of a cutoff switching element that is a motor cutoff FET occur at the same time to form a closed-loop circuit, and a failure detection method of the motor control device.

Solution to Problem

A motor control device according to the present invention to achieve the above object is a motor control device including a motor and a motor drive circuit that is connected to a power supply device and the motor and controls an output of the motor, the motor control device including a processing unit that detects a closed-loop circuit formed by the motor and the motor drive circuit based on a short-circuit failure of switching elements arranged in the motor drive circuit.

Further, a failure detection method for a motor control device according to the present invention to achieve the above object is a failure detection method for a motor control device including a motor and a motor drive circuit that is connected to a power supply device and the motor and controls an output of the motor, the method including a step of detecting a closed-loop circuit formed by the motor and the motor drive circuit based on a short-circuit failure of switching elements arranged in the motor drive circuit.

Advantageous Effects of Invention

According to the motor control device and the failure detection method for the motor control device of the present invention, it is possible to accurately detect whether or not a secondary failure has occurred in which a short-circuit failure of the motor control switching element and a short-circuit failure of the cutoff switching element in the motor drive circuit occur at the same time to form a closed-loop circuit.

Further, in accordance with a primary failure that is a short-circuit failure of only the upper FET and the lower FET that are motor control switching elements of the motor drive circuit or a secondary failure that forms a closed-loop circuit, it is possible to accurately determine the application of the assist force by the motor, thereby preventing the start of the traveling in a dangerous state.

DESCRIPTION OF EMBODIMENT

Embodiments of the present invention will be described with reference to the drawings.

First Embodiment

Figure 1:
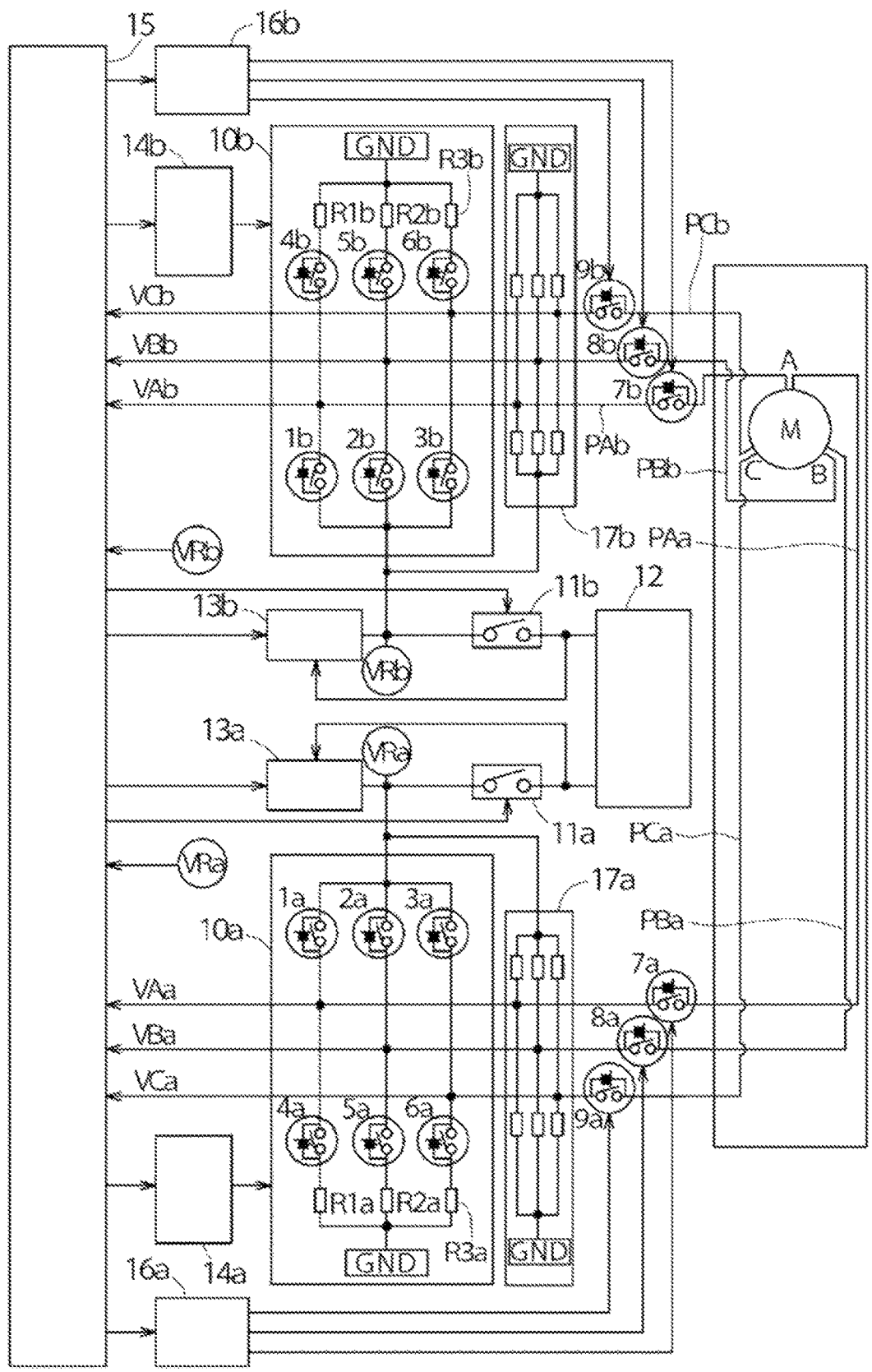
FIG. 1 is a circuit configuration diagram of an electric power steering apparatus including a two-system motor drive circuit.

FIG. 1 is a circuit configuration diagram of an electric power steering apparatus of a first embodiment, which is configured to include a two-system motor drive circuit for one motor. The motor has three-phase motor windings for each of the first system and the second system. In this embodiment, a description will be made by taking a two-system motor drive system circuit as an example, but the same process can be performed even with a configuration including a motor drive circuit with three or more systems. Further, in this embodiment, the three-phase motor M (brushless motor) is illustrated as the motor, but the same process can be performed even for a multi-phase motor having multi-phase motor windings of three or more phases, or a brushed motor. Further, instead of a structure in which one motor has motor windings of a plurality of systems, a plurality of brushless motors or a plurality of brushed motors corresponding to each of the plurality of systems can be arranged and configured. The electric power steering apparatus is an example of a motor control device.

The electric power steering apparatus is mechanically connected to a steering shaft via a gear (not shown) and transmits steering assist torque according to the steering direction and steering torque of the steering wheel to this steering shaft. The configuration of the steering system connected after the steering shaft is the same as that of the related art technique disclosed in Patent Document 1, and thus, the description thereof will be omitted.

The three-phase motor M is drive-controlled by a drive circuit system of two systems. In the first system and the second system, switching elements FET 1a to FET 9a, FET 1b to FET 9b, and the like having a bridge configuration are shown symmetrically in the vertical direction and have the same device configuration.

The three-phase motor drive circuit 10a of the first system and the three-phase motor drive circuit 10b of the second system are connected to the three-phase motor M via three-phase power lines PAa and PAb, PBa and PBb, PCa and PCb.

On the high potential sides of the motor drive circuit 10a of the first system and the motor drive circuit 10b of the second system, a battery 12 commonly used in both systems via a power cutoff circuit 11a of the first system and a power cutoff circuit 11b of the second system, respectively, and a precharge circuit 13a and a precharge circuit 13b are connected in parallel. Further, the battery 12 is configured so that electric power can be repeatedly charged to the precharge circuit 13a and the precharge circuit 13b. Thereby, each precharge circuit can output a predetermined voltage. The predetermined voltage may be substantially equal to the battery voltage or may be lower than the battery voltage.

Each of the motor drive circuit 10a and the motor drive circuit 10b is a three-phase inverter and is configured of six switching elements for switching the energization state of the three-phase motor M. The above-described MOSFET is used as a motor control switching element.

The drains of the upper FETs 1a to 3a of the motor drive circuit 10a and the drains of the upper FETs 1b to 3b of the motor drive circuit 10b are connected to the high potential sides and the respective sources thereof are connected to the drains of the lower FETs 4a to 6a of the motor drive circuit 10a and the drains of the lower FETs 4b to 6b of the motor drive circuit 10b.

The sources of these lower FETs 4a to 6a and lower FETs 4b to 6b are connected to the ground sides via shunt resistors R1a to R3a and shunt resistors R1b to R3b respectively. That is, the low potential sides of the motor drive circuit 10a and the motor drive circuit 10b are grounded. The potential differences generated across both ends of each of the shunt resistors R1a to R3a and the shunt resistors R1b to R3b are input to an arithmetic processing unit 15 via the corresponding current detection circuits (not shown). The arithmetic processing unit 15 calculates the current of each phase from the potential difference of each shunt resistor.

In addition, from the connection lines that connect the upper FETs 1a to 3a and the upper FETs 1b to 3b, and the lower FET 4a to 6a and the lower FETs 4b and 6b, the A-phase (U-phase) power line PAa and power line PAb of the three-phase motor M, the B-phase (W-phase) power line PBa and power line PBb of the phase motor M and the C-phase (V-phase) power line PCa and power line PCb of the three-phase motor M are drawn out.

The power line PAa and the power line PAb, the power line PBa and the power line PBb, the power line PCa and the power line PCb are provided with a motor cutoff FET 7a and a motor cutoff FET 7b, a motor cutoff FET 8a and a motor cutoff FET 8b, a motor cutoff FET 9a and a motor cutoff FET 9b, respectively, as motor cutoff switching elements that cut off the power supply of the motor.

Further, a FET drive circuit 14a and a FET drive circuit 14b are connected to the motor drive circuit 10a and the motor drive circuit 10b. The switching control is performed on the upper FETS 1a to 3a and the lower FET 4a to 6a of the motor drive circuit 10a, and the upper FETs 1b to 3b and the lower FETs 4b to 6b of the motor drive circuit 10b by a control command from the arithmetic processing unit 15 which is a CPU.

On the other hand, a motor cutoff circuit 16a and a motor cutoff circuit 16b are connected to the motor cutoff FETs 7a to 9a of the first system and the motor cutoff FETs 7b to 9b of the second system, respectively. Each motor cutoff circuit performs the switching control of each motor cutoff FET by the control command from the arithmetic processing unit 15.

Further, in parallel with the motor drive circuit 10a and the motor drive circuit 10b, there are provided a voltage dividing circuit 17a and a voltage dividing circuit 17b configured by connecting three circuits in parallel in which two resistors are connected in series. The midpoints of each of series resistors in the voltage dividing circuit 17a and the voltage dividing circuit 17b are connected to the power lines PAa to PCa and the power lines PAb to PCb, respectively, and a predetermined voltage is applied to these power lines at the time of diagnosis. Here, the resistance value of each resistance that constitutes the voltage dividing resistance is higher than the shunt resistance and the winding resistance of the motor.

The arithmetic processing unit 15 for controlling the overall operation is connected to the power cutoff circuit 11a, the precharge circuit 13a, the FET drive circuit 14a, and the motor cutoff circuit 16a of the first system, and the power cutoff circuit 11b, the precharge circuit 13b, the FET drive circuit 14b, and the motor cutoff circuit 16b of the second system, and the operation of each circuit is controlled based on a control command whose tip is indicated by an arrow.

In addition, a drive voltage VRa and a drive voltage VRb, phase voltages VAa, VBa, VCa, and phase voltages VAb, VBb, and VCb are also input to the arithmetic processing unit 15 as shown by arrow tips in the drawing, and thus the arithmetic processing unit 15 can measure and monitor each voltage.

Also, the arithmetic processing unit 15 diagnoses the presence or absence of a short-circuit failure or a secondary failure forming a closed-loop circuit, as described later. Further, the arithmetic processing unit 15 carries out or stops assist control of the steering assist torque, as described later. In addition, the arithmetic processing unit 15 can be the main operating body of each step in the flowchart diagrams described later. The arithmetic processing unit 15 is an example of a processing unit.

Figure 2:
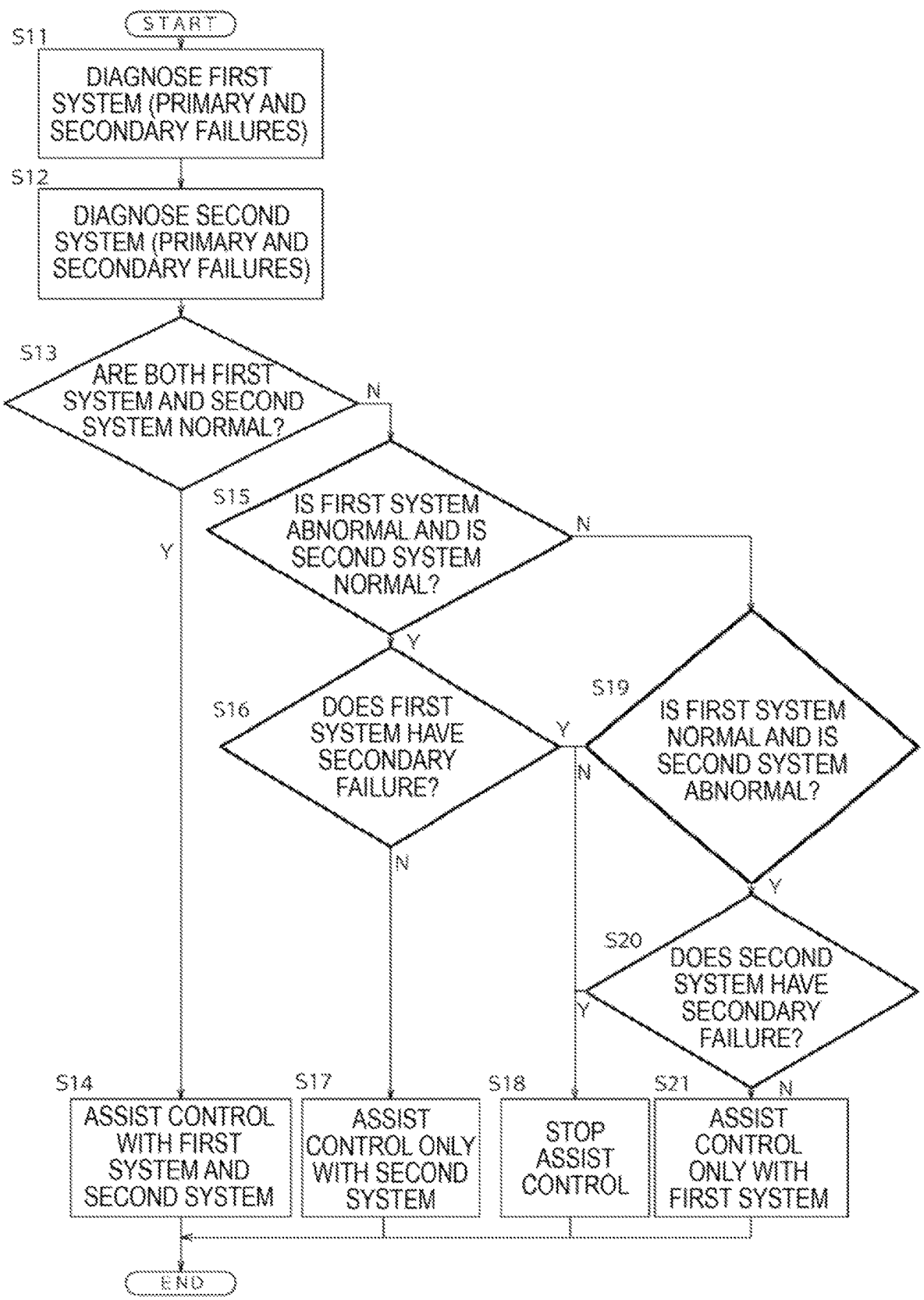
FIG. 2 is a flowchart diagram for diagnosing a short-circuit failure after the power is turned on according to a first embodiment.

FIG. 2 is a flowchart diagram for diagnosing a short-circuit failure before the traveling of the vehicle, which is performed immediately after the power is turned on (the power switch is turned on) in the electric power steering apparatus configured as described above. The power switch may be, for example, a switch (ignition switch) for operating an engine of a vehicle equipped with the electric power steering apparatus.

First, in step S11 after the start, a diagnosis is performed regarding the occurrence of a primary failure of only a short-circuit failure of the upper FETs 1a to 3a and the lower FETs 4a to 6a of the first system motor drive circuit 10a, which is the circuit configuration on the lower side of FIG. 1, or a secondary failure in which a short-circuit failure of FETs 1a to 6a and a short-circuit failure of the motor cutoff FETs 7a to 9a occur at the same time to form a closed-loop circuit.

Figure 3:
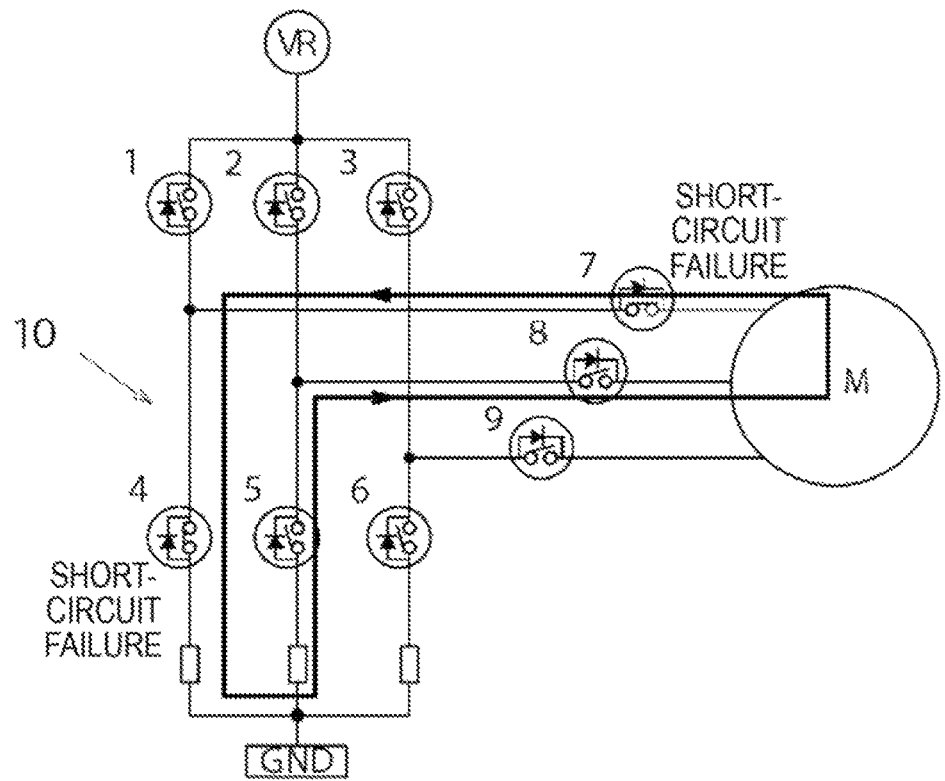
FIG. 3 is a circuit configuration diagram illustrating a state in which a failure mode A has occurred.
Figure 4:
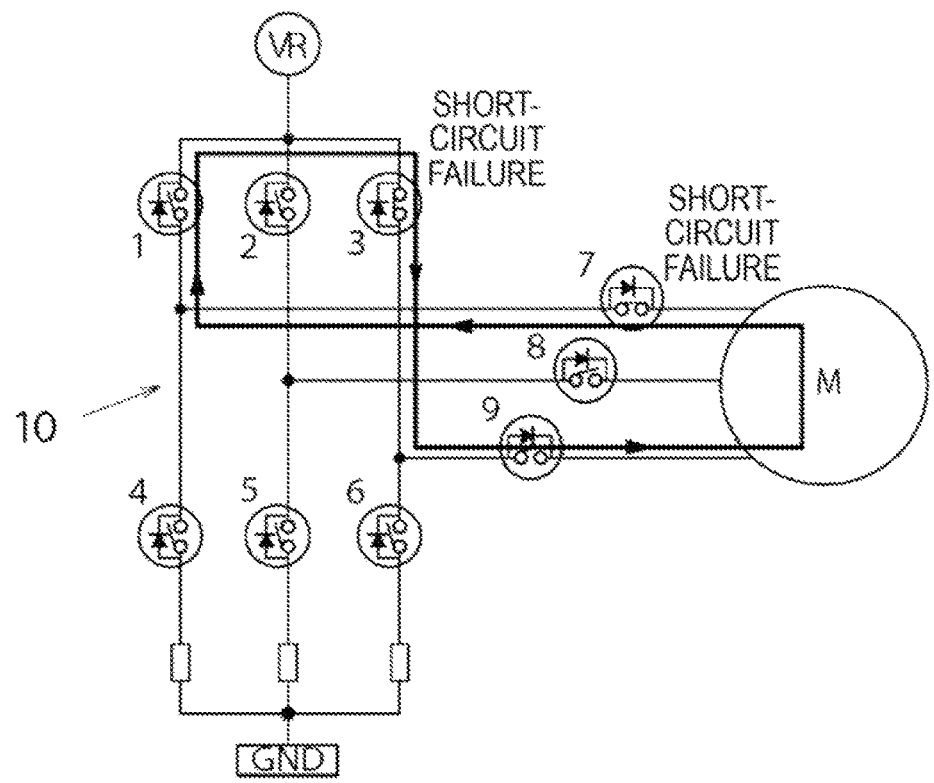
FIG. 4 is a circuit configuration diagram illustrating a state in which a failure mode B has occurred.

Based on the short-circuit failure of the FETs 1a to 9a of the switching elements arranged between the precharge circuit 13a that is the power supply device, and the three-phase motor M, the secondary failure forming a closed-loop circuit can be further divided into two failure modes A and B, which are shown in the circuit configuration diagrams of FIGS. 3 and 4.

FIGS. 3 and 4 are circuit configuration diagrams in which the circuit configuration of the first system including the three-phase motor M is partially extracted from the circuit configuration of the electric power steering apparatus shown in FIG. 1. The same circuit configuration is also used when diagnosing a short-circuit failure of the second system in step S12 described later. In FIG. 1, a lowercase letter a is used to indicate the first system, and a lowercase letter b is used to indicate the second system. However, FIGS. 3 and 4 are illustrated without the lower case letters a and b.

The failure mode A, which is the secondary failure shown in FIG. 3, is a state where a closed-loop circuit is formed when one of the lower FETs 4a to 6a has a short-circuit failure, and the motor cutoff FET in the same phase as the lower FET having the short-circuit failure has a short-circuit failure. FIG. 3 shows an example in which the lower FET 4a and the motor cutoff FET 7a in the same phase as the lower FET 4a have a short-circuit failure.

At this time, a substantially resistanceless closed-loop circuit is formed as shown by the arrow in FIG. 3, and when the vehicle starts the traveling in this state, the braking force by the motor is generated as described above and safe steering is hindered.

The failure mode B, which is the secondary failure shown in FIG. 4, is a state where a closed-loop circuit is formed when any one of the upper FETs 1a to 3a has a short-circuit failure and the motor cutoff FETs 7a to 9a in a different phase from the upper FETs 1a to 3a having the short-circuit failure have a short-circuit failure. FIG. 4 shows an example in which the upper FET 3a and the motor cutoff FET 7a in a different phase from the upper FET 3a have a short-circuit failure.

At this time as well, a substantially resistanceless closed-loop circuit is formed as shown by the arrow in FIG. 4 and when the vehicle starts the traveling in this state, the braking force by the motor is generated as described above and safe steering is hindered. The diagnosis result of the first system diagnosed by the detection method of the primary failure and the secondary failure described later is stored in a memory (not shown).

FIGS. 3 and 4 are explanatory diagrams of the drive circuit of a three-phase brushless motor but the closed-loop circuit is generated even when a secondary failure occurs in a brushed motor and the drive circuit thereof (H bridge circuit). Thus, a secondary failure can be detected by the same detection method.

Returning to FIG. 2, in step S12, a diagnosis is performed regarding the occurrence of a primary failure of only a short-circuit failure of the upper FETs 1b to 3b and the lower FETs 4b to 6b of the second system motor drive circuit 10b, which is the circuit configuration on the upper side of FIG. 1 or a second failure in which a short-circuit failure of the FETs 1b to 6b and a short-circuit failure of the motor cutoff FETs 7b to 9b occur at the same time to form a closed-loop circuit.

Since the two failure modes A and B of the second system to be diagnosed in step S12 are exactly the same as those of the first system and only the target FETs are different, the description thereof is omitted here. Similarly, the diagnosis result of the second system is also stored in a memory (not shown).

In step S13, it is determined whether or not a primary failure or a secondary failure has been detected in the first system and the second system based on the stored diagnosis results of the first and second systems. If a primary failure or a secondary failure is not detected in any of the circuits of the first system and the second system, it is determined to be normal and the process proceeds to step S14, in which the assist control of the steering assist torque is started with the normal first system and second system. Then, the initial diagnosis is completed.

In step S13, if a primary failure or a secondary failure is detected in at least one of the first system and the second system, the process proceeds to step S15.

In step S15, it is determined whether or not the abnormality due to a primary failure or a secondary failure is detected only in the first system. If the abnormality is detected in the first system and the second system is determined to be normal without detecting an abnormality the process proceeds to step S16. Then, in step S16, it is determined whether the abnormality of the first system is a secondary failure forming a closed-loop circuit.

In step S16, if the abnormality of the first system is not a secondary failure, it is determined to be an abnormality due to a primary failure and the process proceeds to step S17, in which assist control of the steering assist torque is started only with the second system which is in the normal state. At the same time, a warning indicating that the first system is abnormal due to a primary failure is displayed and the initial diagnosis is completed.

On the other hand, if the failure of the first system is a secondary failure in step S16, the process proceeds to step S18 and all the assist control of the steering assist torque by the first system and the second system is immediately stopped. A warning indicating that the first system has a secondary failure is displayed and the initial diagnosis is completed.

In step S15, in the case other than the abnormality of only the first system, the process proceeds to step S19 and it is determined whether or not the first system is normal without detecting an abnormality and an abnormality is detected in the second system. If only the second system is abnormal the process proceeds to step S20.

In step S20, if the failure of the second system is a secondary failure, the process proceeds to step S18 and all the assist control of the steering assist torque by the first system and the second system is immediately stopped. A warning indicating that the second system has a secondary failure is displayed and the initial diagnosis is completed.

In step S20, if the abnormality of the second system is not a secondary failure, it is determined that the abnormality is due to a primary failure and the process proceeds to step S21, in which the assist control of the steering assist torque is started only with the first system which is in the normal state. At the same time, a warning indicating that the second system is abnormal due to the primary failure is displayed and the initial diagnosis is completed.

On the other hand, in step S19, if an abnormality is detected not only in the second system but also in the first system, the process proceeds to step S18 and all the assist control of the steering assist torque by the first system and the second system is immediately stopped. Then, a warning indicating that both the first system and the second system have a failure is displayed and the initial diagnosis is completed.

As described above, when the electric power steering apparatus is turned on, the initial diagnosis of the short-circuit failure state of each FET in the first and second drive circuit systems is performed. If a primary failure is detected only one of the first and second systems, the assist control of the steering assist torque is performed only with the other system which is normal.

If a secondary failure is detected in either the first system or the second system, or if a primary failure or a secondary failure is detected in both the first system and the second system, the control to stop the assist control of steering assist torque is performed. Thereby, it is possible to prevent the start of traveling in a dangerous state. In addition, the number of systems of a plurality of systems may be three or more.

In the case of a three-system drive circuit, if a secondary failure is detected in at least one of the first system, the second system, and the third system, the assist control is stopped. Further, if at least one of the first system, the second system, and the third system is normal and all the abnormal systems detect only a primary failure, the assist control is continued with the normal system. If a primary failure is detected in all systems, the assist control is stopped.

Second Embodiment

The electric power steering apparatus according to the first embodiment is an electric power steering apparatus that includes two systems of motor drive circuits 10a and 10b and performs a diagnosis process for a primary failure and a secondary failure. The electric power steering apparatus according to a second embodiment may be any electric power steering apparatus including the motor drive circuit 10 of at least one system and can quickly detect a secondary failure based on the failure mode A described above.

Along with the secondary failure detection process based on the failure mode A, it is possible to detect a primary failure, which is a short-circuit failure of the lower FETs 4 to 6 of the motor drive circuit 10.

Figure 5:
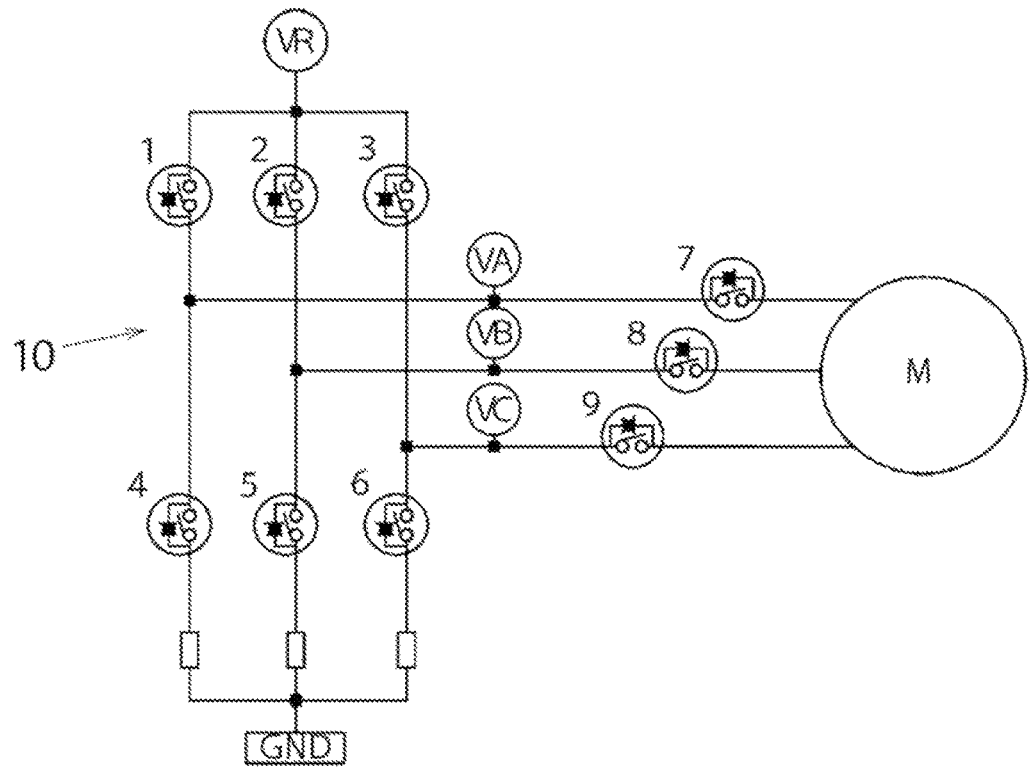
FIG. 5 is a circuit configuration diagram of an electric power steering apparatus including a one-system motor drive circuit.

FIG. 5 is a circuit configuration diagram of an electric power steering apparatus in which one-system motor drive circuit 10 is connected to the three-phase motor M and is the same as the circuit configuration diagram in which only one system is extracted of the circuit configuration diagram shown in FIG. 1 although some components are omitted. In FIG. 1, reference numeral a is used to indicate the first system, and reference numeral b is used to indicate the second system. However, in FIG. 5 showing only the circuit of one system, the description will be made without adding a and b.

Although the illustration of the voltage dividing circuit 17 is omitted for simplification, the voltage dividing circuit 17 is configured by connecting three circuits in which two resistors are connected in series in parallel with the motor drive circuit 10. The midpoints of the series resistors in the voltage dividing circuit 17 are connected to the power lines PA to PC, respectively, and the phase voltages VA to VC can be measured and monitored by the arithmetic processing unit 15.

Therefore, in the three-phase motor drive circuit 10, the sources of the upper FETs to 3 are connected to the drains of the lower FETs 4 to 6, and three power lines PA, PB, and PC are drawn out for each phase from the connection parts of the upper FETs 1 to 3 and the lower FETs 4 to 6 and connected to the three-phase motor M, respectively.

The power lines PA, PB, and PC are provided with the motor cutoff FETs 7 to 9, respectively, and the phase voltages VA, VB, and VC are configured to be measured and monitored by the arithmetic processing unit 15 (not shown).

Figure 6:
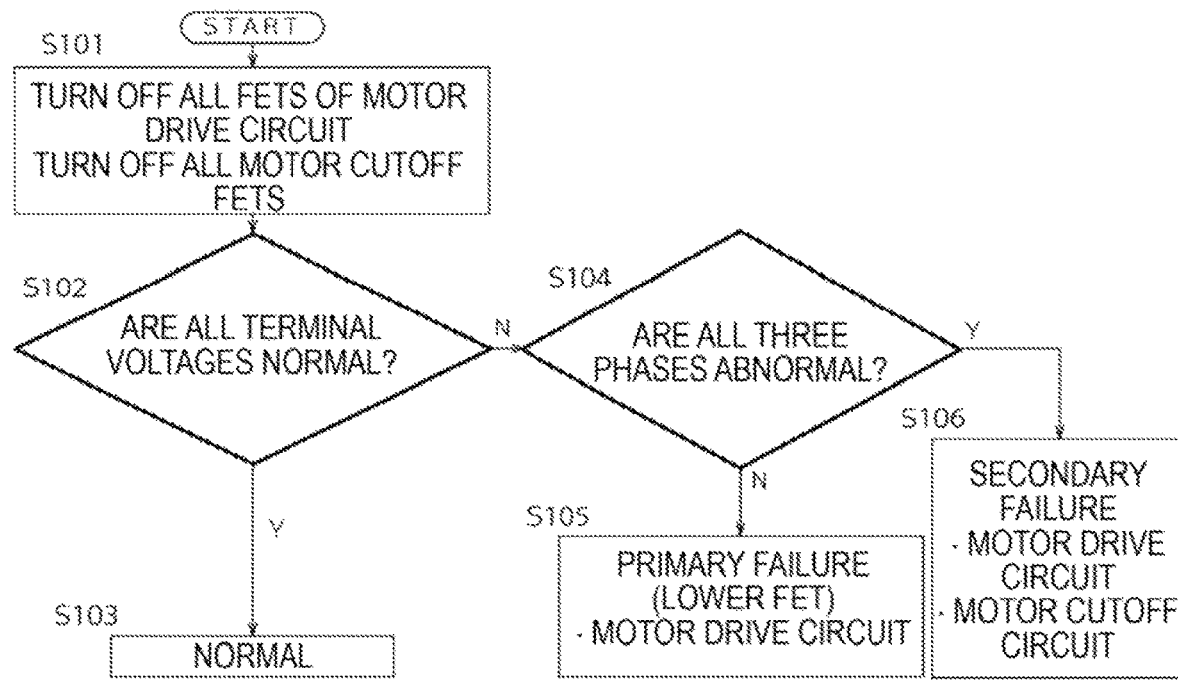
FIG. 6 is a flowchart diagram for diagnosing a short-circuit failure in the failure mode A of a second embodiment.

FIG. 6 is a flowchart diagram for diagnosing a short-circuit failure in the failure mode A before the traveling in the second embodiment, and similarly to the diagnosis process in the first embodiment, the diagnosis process is performed immediately after the power is turned on.

First, in step S101 after the start, the upper FETs 1 to 3 and the lower FETs 4 to 6 of the motor drive circuit 10, and the motor cutoff FETs 7 to 9 are all turned off. This is performed by the arithmetic processing unit 15 on the motor drive circuit 10 and the motor cutoff circuit 16 based on a switching control command to turn off all the FETs. Further, the power cutoff circuit 11 (not shown) is turned off and the precharge circuit 13 is turned on.

Subsequently, in step S102, it is determined whether or not the measured values of the monitored phase voltages VA, Vb, and VC are within a predetermined voltage range that is a normal value. Since all the FETs are in the OFF state, the voltage obtained by dividing the voltage of the precharge circuit by the voltage dividing circuit 17 is measured if normal. If all the phases are within the predetermined voltage range, the process proceeds to step S103 and it is determined that the electric power steering apparatus is normal.

In step S102, if at least one phase of the measured values of the phase voltages VA, VB, and VC shows an abnormal value that is outside the predetermined range, which is the normal value, the process proceeds to step S104.

In step S104, it is determined whether or not an abnormal value of the measured value of each phase voltage VA, VB, VC is detected in all three phases. When only one phase or two phases of the measured values of the phase voltages VA, VB, and VC show an abnormal value that is substantially the same potential as GND, the process proceeds to step S105. That is, when the measured values of the phase voltages VA, VB, and VC include both normal values and abnormal values thereof, the process proceeds to step S105.

The state in which only one phase of the measured values of the phase voltages VA, VB, and VC shows an abnormal value indicates a state in which a primary failure of the lower FETs 4 to 6 of the motor drive circuit 10 has occurred. For example, when only the lower FET 4 has a short-circuit failure as shown in the circuit configuration diagram of FIG. 7, a current is generated as shown by a thick line and only the measured value of the A-phase voltage VA has the same potential as GND.

When two phases of the measured values of the phase voltages VA, VB, and VC show abnormal values, it means that two of the lower FETs 4 to 6 corresponding to the abnormal values have a short-circuit failure at the same time. A warning indicating a primary failure is displayed and the diagnosis process is completed.

In step S104, if all three phases of the measured values of respective phase voltages VA, VB, and VC show abnormal values that are substantially the same potential as GND, the process proceeds to step S106.

The state in which the measured values of the phase voltages VA, VB, and VC show abnormal values in all three phases indicates a state in which a secondary failure has occurred in which a short-circuit failure occurs in the lower FETs 4 to 6 of the motor drive circuit 10 and the motor cutoff FETs 7 to 9 in the same phase as the lower FETs 4 to 6 at the same time to form a closed-loop circuit. For example, as shown in the circuit configuration diagram of FIG. 8, when the lower FET 4 and the motor cutoff FET 7 in the same phase have a short-circuit failure, a current is generated as indicated by a thick line and the measured values of the phase voltages VA, VB, and VC are substantially the same potential as GND because the shunt resistance and the winding resistance of the motor are extremely small.

Even if there is a short-circuit failure in the lower FET 5 and the motor cutoff FET 8 in the same phase, and in the lower FET 6 and the motor cutoff FET 9 in the same phase, similar abnormalities in the measured values of each phase voltage VA, VB, and VC are obtained. In step S106, a warning indicating a secondary failure is displayed and the diagnosis process is completed.

Even when all of the lower FETs 4 to 6 have a short-circuit failure at the same time, the measured values of all three phases show abnormal values. However, the possibility of short-circuit failure to all three at the same time is extremely low, and thus such a state is excluded from the diagnosis target. In the secondary failure, it is assumed that one short-circuit failure has occurred among the lower FETs 4 to 6 and one short-circuit failure has occurred among the motor cutoff FETs 7 to 9.

As described above, it is possible to quickly discriminate, by monitoring the respective phase voltages VA, VB, and VC only once, that the state corresponds to which one among the normality, a primary failure that is a short-circuit failure of the motor drive circuit, and a secondary failure in which a short-circuit failure of the motor drive circuit and a short-circuit failure of the motor cutoff FET occur at the same time to form a closed-loop circuit.

When a secondary failure has occurred, it is possible to immediately stop assisting the steering assist torque by the motor drive circuit and prevent the start of the traveling in a dangerous state.

Also, the electric power steering apparatus has been described as an electric power steering apparatus including the motor drive circuit 10 of one system, but an electric power steering apparatus including two or more systems of motor drive circuit 10 may be used.

Figure 7:
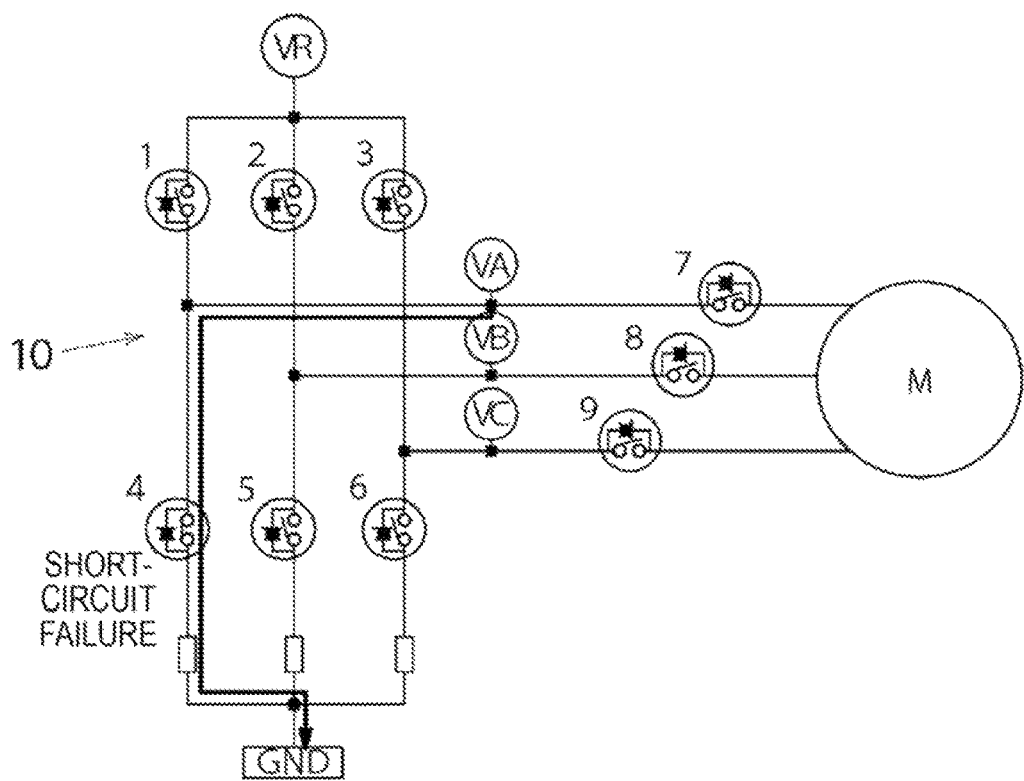
FIG. 7 is a circuit configuration diagram illustrating a state in which a primary failure has occurred during the diagnosis of the failure mode A.
Figure 8:
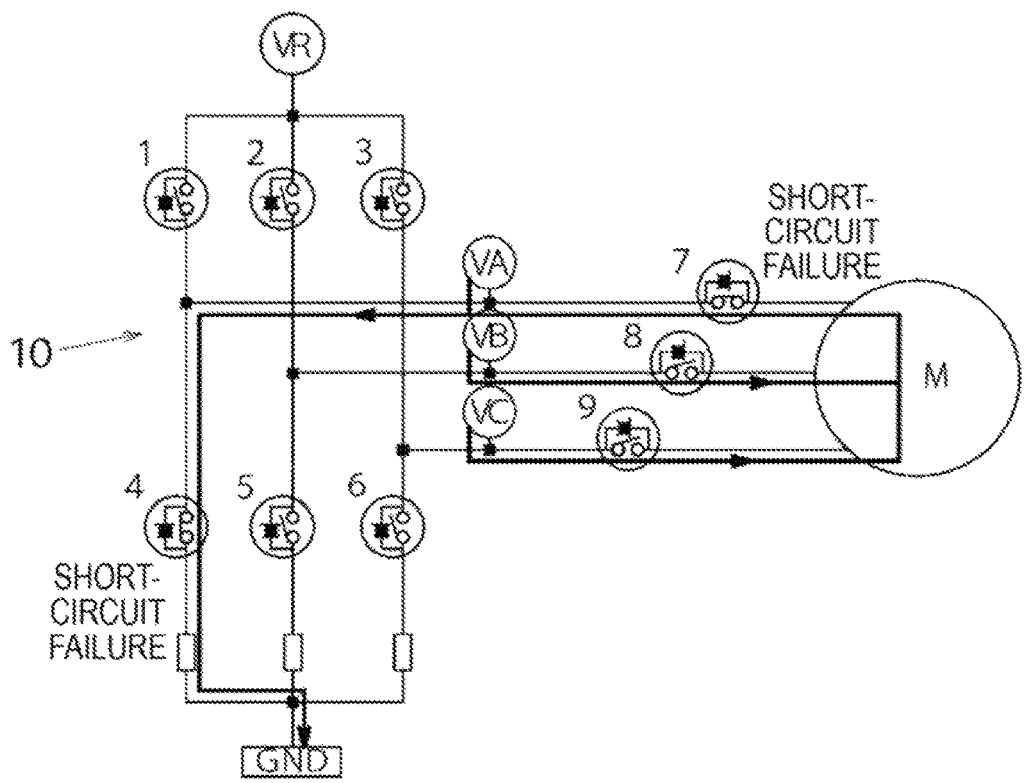
FIG. 8 is a circuit configuration diagram illustrating a state in which a secondary failure has occurred during the diagnosis of the failure mode A.

In such a case, when a primary failure shown in FIG. 7 is detected in only one of the first and second systems, the assist control of the steering assist toque is performed only with the other system which is normal. When a secondary failure shown in FIG. 8 is detected in either the first system or the second system, or when a primary failure is detected in both the first system and the second system, the assist control of steering assist torque is stopped. Thereby, it is possible to prevent the start of traveling in a dangerous state.

Third Embodiment

The electric power steering apparatus of a third embodiment may be any electric power steering apparatus including the motor drive circuit 10 of at least one system, as in the electric power steering apparatus of the second embodiment, and can quickly detect a secondary failure based on the failure mode B described above. Along with the secondary failure detection process based on the failure mode B, it is possible to detect a primary failure, which is a short-circuit failure of the upper FETs 1 to 3 of the motor drive circuit 10 as well.

The circuit configuration diagram of the electric power steering apparatus of the third embodiment is the same as that of FIG. 5. Although some of the components are omitted from the illustration, it is the same as the circuit configuration diagram in which only the first system of the circuit configuration diagram shown in FIG. 1 is extracted.

Figure 9:
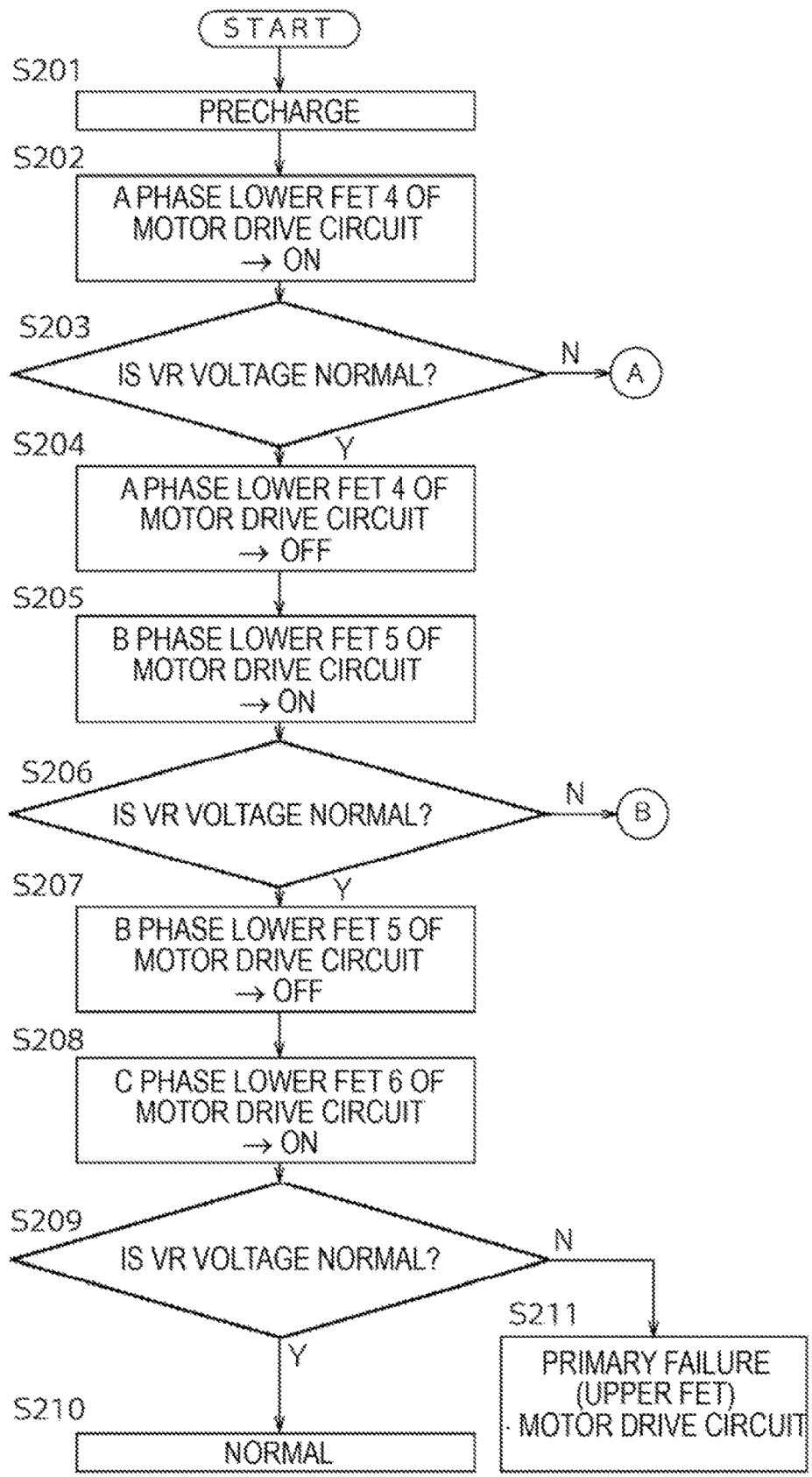
FIG. 9 is a part of a flowchart diagram for diagnosing a short-circuit failure in the failure mode B of a third embodiment.
Figure 10:
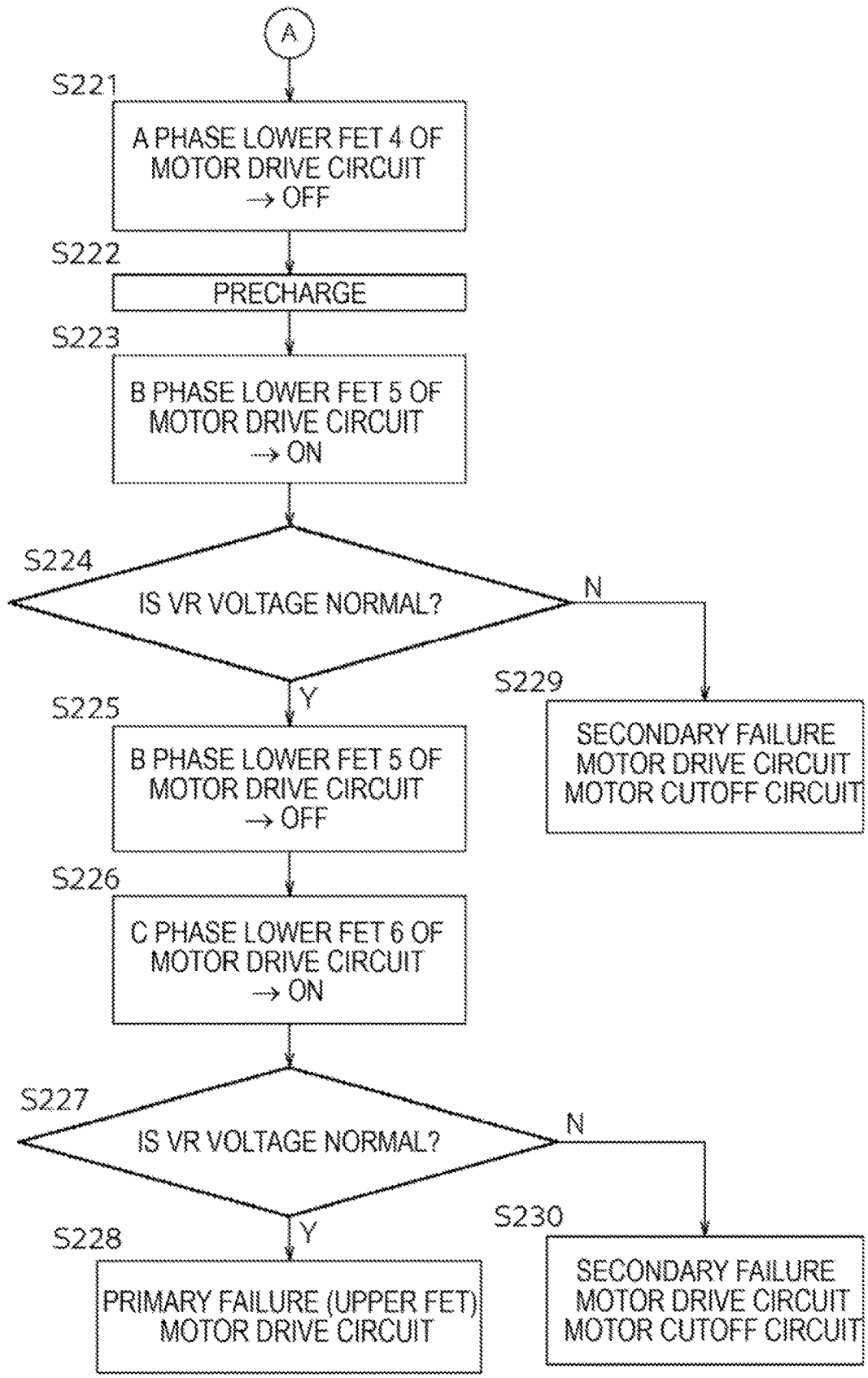
FIG. 10 is a part of a flowchart diagram for diagnosing a short-circuit failure in the failure mode B of the third embodiment.
Figure 11:
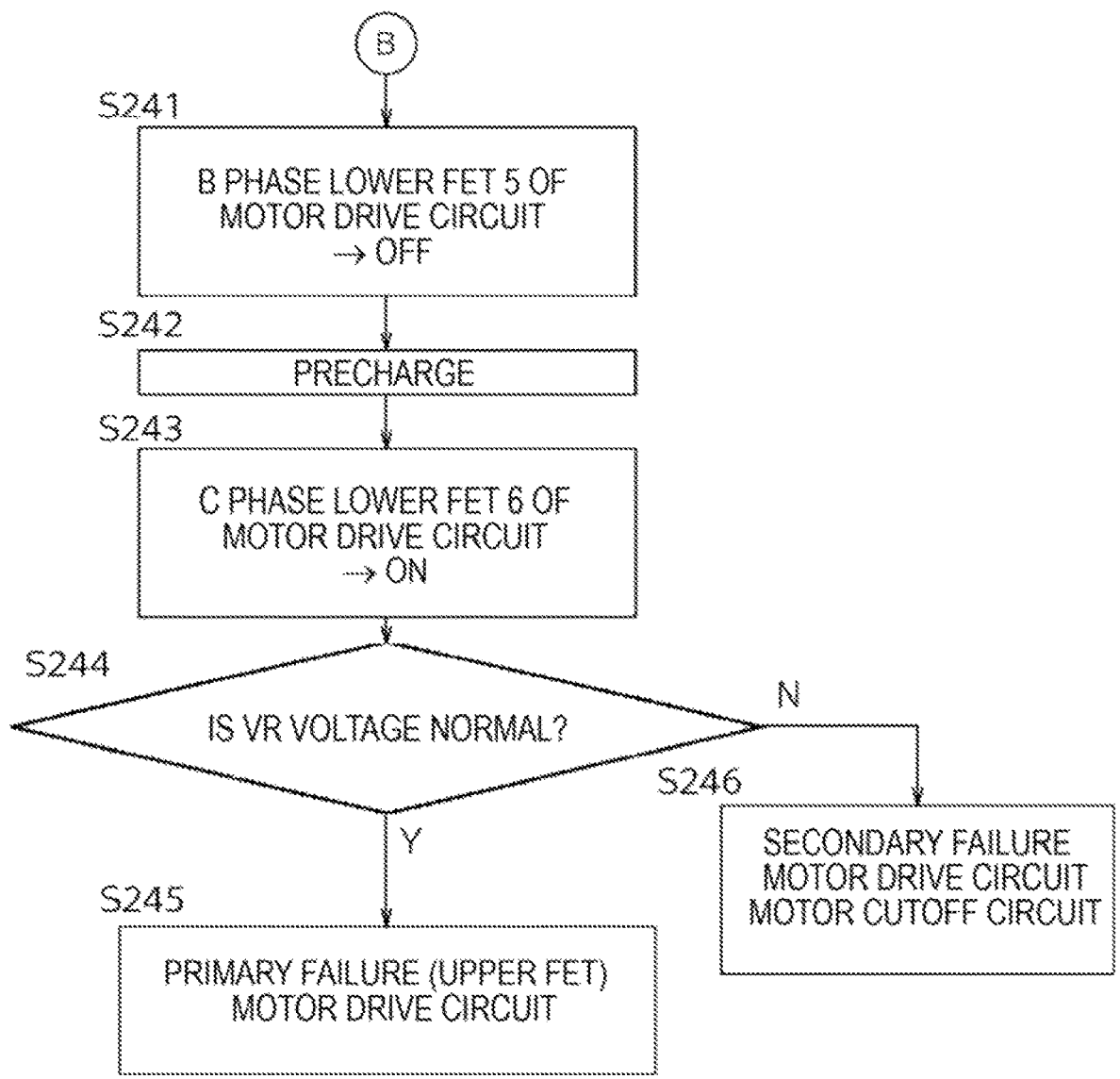
FIG. 11 is a part of a flowchart diagram for diagnosing a short-circuit failure in the failure mode B of the third embodiment.

FIGS. 9 to 11 are flowchart diagrams for diagnosing a short-circuit failure in the failure mode B before the traveling in the third embodiment. Similar to the diagnosis process in the first embodiment, the diagnosis process is performed immediately after the power is turned on.

First, in step S201, the upper FETs 1 to 3 and the lower FETs 4 to 6 of the motor drive circuit 10, and the motor cutoff FETs 7 to 9 are all turned off based on a switching control command from the arithmetic processing unit 15, and the precharge circuit 13 boosts the drive voltage VR until a predetermined voltage value is reached. The ON or OFF control of the lower FETs 4 to 6, which will be described later, is also performed based on the switching control command from the arithmetic processing unit 15.

As the predetermined voltage value of the precharge circuit 13, it is preferable to use the one having a value lower than the voltage value of the battery 12 in consideration of the FET damage due to the arm short circuit because the process for detecting a short-circuit failure of the FET due to the arm short circuit described later is performed. For example, the voltage value of the precharge circuit 13 is assumed to be a voltage value that does not cause erroneous detection in diagnosis and does not damage the drive circuit. This voltage value may be, for example, about 4 (V), a voltage value satisfying the above assumption in the range from 4 (V) to several volts, or another voltage value.

Subsequently, in step S202, the lower FET 4 which is an example of the first lower switching element is turned on, and in step S203, it is determined whether or not the measured value of the drive voltage VR is maintained within a normal predetermined range. When the measured value of the drive voltage VR is normal, the process proceeds to step S204 and the lower FET 4 is turned off.

Next, in step S205, the lower FET 5 which is an example of the second lower switching element is turned on, and in step S206, it is determined whether or not the measured value of the drive voltage VR is maintained within a normal predetermined range. When the measured value of the drive voltage VR is normal, the process proceeds to step S207 and the lower FET 5 is turned off.

Subsequently, in step S208, the lower FET 6 is turned on, and in step S209, it is determined whether or not the measured value of the drive voltage VR is maintained within a normal predetermined range. When the measured value of the drive voltage VR is normal, the process proceeds to step S210, in which it is determined that both the motor drive circuit 10 and the motor cutoff circuit are normal, the lower FET 6 is turned off, and the diagnosis process is completed. Although the ON or OFF control is performed in the order of the lower FETs 4 to 6, there is no problem even if the ON or OFF control is sequentially started from any lower FET.

On the other hand, if it is determined that the drive voltage VR is abnormal in step S203, the process moves to step S221 in FIG. 10 and the lower FET 4 is turned off. When the drive voltage VR is abnormal in step S203, the following three short-circuit failure states are possible.

Figure 12:
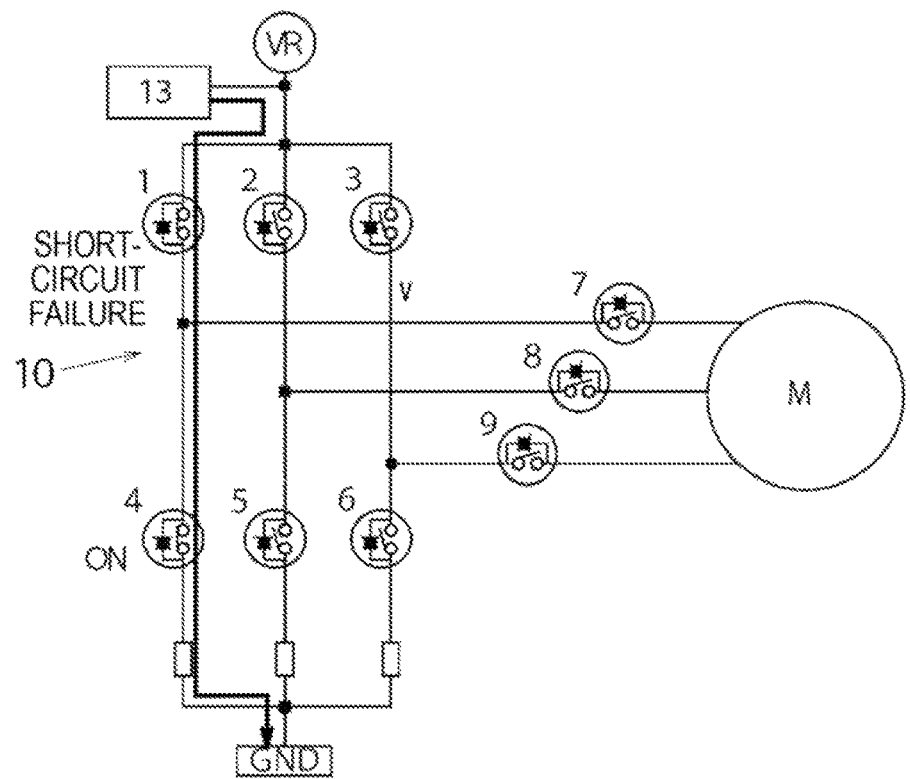
FIG. 12 is a circuit configuration diagram illustrating a state in which a primary failure has occurred during the diagnosis of the failure mode B.

A first short-circuit failure state is a state in which a primary failure occurs in which only the upper FET in the same phase as the turned-on lower FET has a short-circuit failure, as shown in the circuit configuration diagram of FIG. 12. A second short-circuit failure state is a state in which a secondary failure occurs in which a short-circuit failure of the upper FET 1 in the same phase as the turned-on lower FET 4 and a short-circuit failure of the motor cutoff FET in a different phase from the turned-on lower FET 4 occur at the same time to form a closed-loop circuit. A third short-circuit failure state is a state in which a secondary failure occurs in which a short-circuit failure of the upper FET in a different phase from the turned-on lower FET and a short-circuit failure of the motor cutoff FET in the same phase as the turned-on lower FIT occur at the same time to form a closed-loop circuit, as shown in the circuit configuration diagram of FIG. 13. Simultaneous short-circuit failure of the upper FET and the motor cutoff FET in the same phase, which does not form a closed-loop, is treated as a primary failure in the same manner as the primary failure in which only the upper FET in the same phase as the turned-on lower FET has a short-circuit failure.

FIG. 12 is a circuit configuration diagram for illustrating a state in which a primary failure has occurred when diagnosing in the failure mode B and shows, for example, a case where a short-circuit failure has occurred in the upper FET 1. In step S202, if the lower FET 4 is turned on in this short-circuit failure state, an arm short circuit from the precharge circuit 13 to GND occurs, so that the drive voltage VR shows an abnormal value such that it has the same potential as GND.

Figure 13:
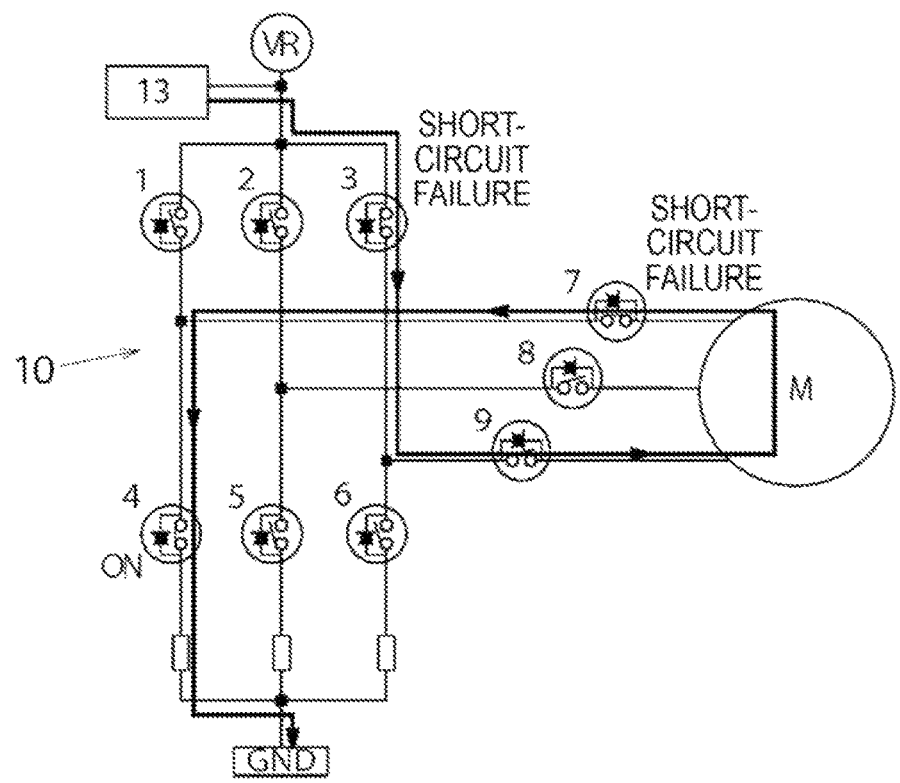
FIG. 13 is a circuit configuration diagram illustrating a state in which a secondary failure has occurred during the diagnosis of the failure mode B.

FIG. 13 is a circuit configuration diagram for illustrating a state in which a secondary failure has occurred when diagnosing in the failure mode B and shows, for example, a case where short-circuit failures of the upper FET 3 and the motor cutoff FET 7 in a different phase from the upper FET 3 have occurred at the same time. In step S202, if the lower FET 4 is turned on in the state of this short-circuit failure, a current is generated as shown by the thick line, and the drive voltage VR shows an abnormal value such that it has the same potential as GND.

Each step of steps S221 to S230 shown in FIG. 10 is a process of determining the states of the above-described first to third short circuit failures. As the first short-circuit failure state, there is one pattern in which a primary failure occurs in which only the upper FET 1 in the same phase as the turned-on lower FET 4 has a short-circuit failure.

As the second short-circuit failure state, there are two patterns in which a secondary failure occurs in which a short-circuit failure of the upper FET 1 in the same phase as the turned-on lower FET 4 and a short-circuit failure of the motor cutoff FET 8 or 9 in a different phase from the turned-on lower FET 4 occur at the same time to form a closed-loop circuit.

As the third short-circuit failure state, there are two patterns in which a secondary failure occurs in which a short-circuit failure of the upper FET 2 or 3 in a different phase from the turned-on lower FET 4 and a short-circuit failure of the motor cutoff FET 7 in the same phase as the turned-on lower FET 4 occur at the same time to form a closed-loop circuit. From the above, a total of 5 patterns of short-circuit failure states are targeted.

Subsequently, in step S222, the drive voltage VR is boosted again by the precharge circuit 13 until a predetermined voltage value is reached. In step S223, the lower FET 5 is turned on and in the next step S224, it is determined whether the drive voltage VR is maintained normal. If the drive voltage VR is maintained normal, the process proceeds to step S225 to turn off the lower FET 5.

In the next step S226, the lower FET 6 is turned on and the process proceeds to step S227 to determine whether or not the drive voltage VR is maintained normal. If the drive voltage VR is normal, the process proceeds to the next step S228, in which it is determined that there is a short-circuit failure of only the upper FET 1, that is, a primary failure of the motor drive circuit 10, and the lower FET 6 is turned off to complete the process.

If it is determined that the drive voltage VR is abnormal in step S224, the process proceeds to step S229, in which it is determined that there is a secondary failure of the motor drive circuit 10 and the motor cutoff circuit, and the lower FET 5 is turned off to complete the process.

The secondary failure in which the drive voltage VR becomes abnormal in step S229 is any of the pattern in which a short-circuit failure of the upper FET 1 and a short-circuit failure of the motor cutoff FET 8 occur at the same time to form a closed-loop circuit, and the pattern in which a short-circuit failure of the upper FET 2 and a short-circuit failure of the motor cutoff FET 7 occur at the same time to form a closed-loop circuit.

If it is determined that the drive voltage VR is abnormal in step S227, the process proceeds to step S230, it is determined that there is a secondary failure of the motor drive circuit 10 and the motor cutoff circuit, and the lower FET 6 is turned off to complete the process.

The secondary failure in which the drive voltage VR becomes abnormal in step S230 is any of the pattern in which a short-circuit failure of the upper FET 1 and a short-circuit failure of the motor cutoff FET 9 occur at the same time to form a closed-loop circuit, and the pattern in which a short-circuit failure of the upper FET 3 and a short-circuit failure of the motor cutoff FET 7 occur at the same time to form a closed-loop circuit.

On the other hand, if it is determined that the drive voltage VR is abnormal in step S206 in FIG. 9, the process proceeds to step S241 in FIG. 11 and the lower FET 5 is turned off.

Each step of steps S241 to S246 shown in FIG. 11 is a process of determining the above-mentioned first to third short-circuit failure states with respect to the turned-on lower FET 5. As the first short-circuit failure state, there is one pattern in which a primary failure occurs in which only the upper FET 2 in the same phase as the turned-on lower FET 5 has a short-circuit failure.

As the second short-circuit failure state, there is one pattern in which a secondary failure occurs in which a short-circuit failure of the upper FET 2 in the same phase as the turned-on lower FET 5 and a short-circuit failure of the motor cutoff FET 9 in a different phase from the turned-on lower FET 5 occur at the same time to form a closed-loop circuit. The short-circuit failure of the upper FET 2 and the simultaneous failure of the motor cutoff FET 7 are detected in step S229 and thus are not detected in the processes of steps S241 to S246.

As the third short-circuit failure state, there is one pattern in which a secondary failure occurs in which a short-circuit failure of the upper FET 3 in a different phase from the turned-on lower FET 5 and a short-circuit failure of the motor cutoff FET 8 in the same phase as the turned-on lower FET 5 occur at the same time to form a closed-loop circuit. The short-circuit failure of the upper FET 1 and the simultaneous failure of the motor cutoff FET 8 are detected in step S229 and thus are not detected in the processes of steps S241 to S246. From the above, a total of three patterns of short-circuit failure states are targeted.

Subsequently, in step S242, the drive voltage VR is boosted again by the precharge circuit 13 until a predetermined voltage value is reached. In step S243, the lower FET 6 is turned on and in the next step S244, it is determined whether or not the drive voltage VR is maintained normal. If the drive voltage VR is maintained normal, the process proceeds to step S245, in which it is determined that there is a short-circuit failure only in the upper FET 2, that is, a primary failure of the motor drive circuit 10, and the lower FET 6 is turned off to complete the process.

If it is determined that the drive voltage VR is abnormal in step S244, the process proceeds to step S246, in which it is determined that there is a secondary failure of the motor drive circuit 10 and the motor cutoff circuit and the lower FET 6 is turned off to complete the process.

The secondary failure in which the drive voltage VR becomes abnormal in step S246 is any of the pattern in which that a short-circuit failure of the upper FET 2 and a short-circuit failure of the motor cutoff FET 9 occur at the same time to form a closed-loop circuit, and the pattern in which a short-circuit failure of the upper FET 3 and a short-circuit failure of the motor cutoff FET 8 occur at the same time to form a closed-loop circuit.

On the other hand, if it is determined that the drive voltage VR is abnormal in step S209 in FIG. 9, the process proceeds to step S211, in which it is determined that there is a short-circuit failure only in the upper FET 3, that is, a primary failure of the motor drive circuit 10, and the lower FET 6 is turned off to complete the process. Since the secondary failure of the second to third short-circuit failures with respect to the upper FET 3 corresponding to the turned-on lower FET 6 is detected in any one of step S229, step S230, and step S246, the abnormality of the drive voltage VR in step 209 is only a short-circuit failure of only the upper FET 3.

In the detection method of the failure mode B described above, the switching control of sequentially turning on and off the lower FETs 4 to 6 one by one is repeated, but if an abnormality occurs in which the drive voltage VR becomes the GND potential when the lower FET 4 is turned on, there is also a method of simultaneously turning on the remaining lower FETs 5 and 6 of the two phases to efficiently detect the primary failure and the secondary failure.

Figure 14:
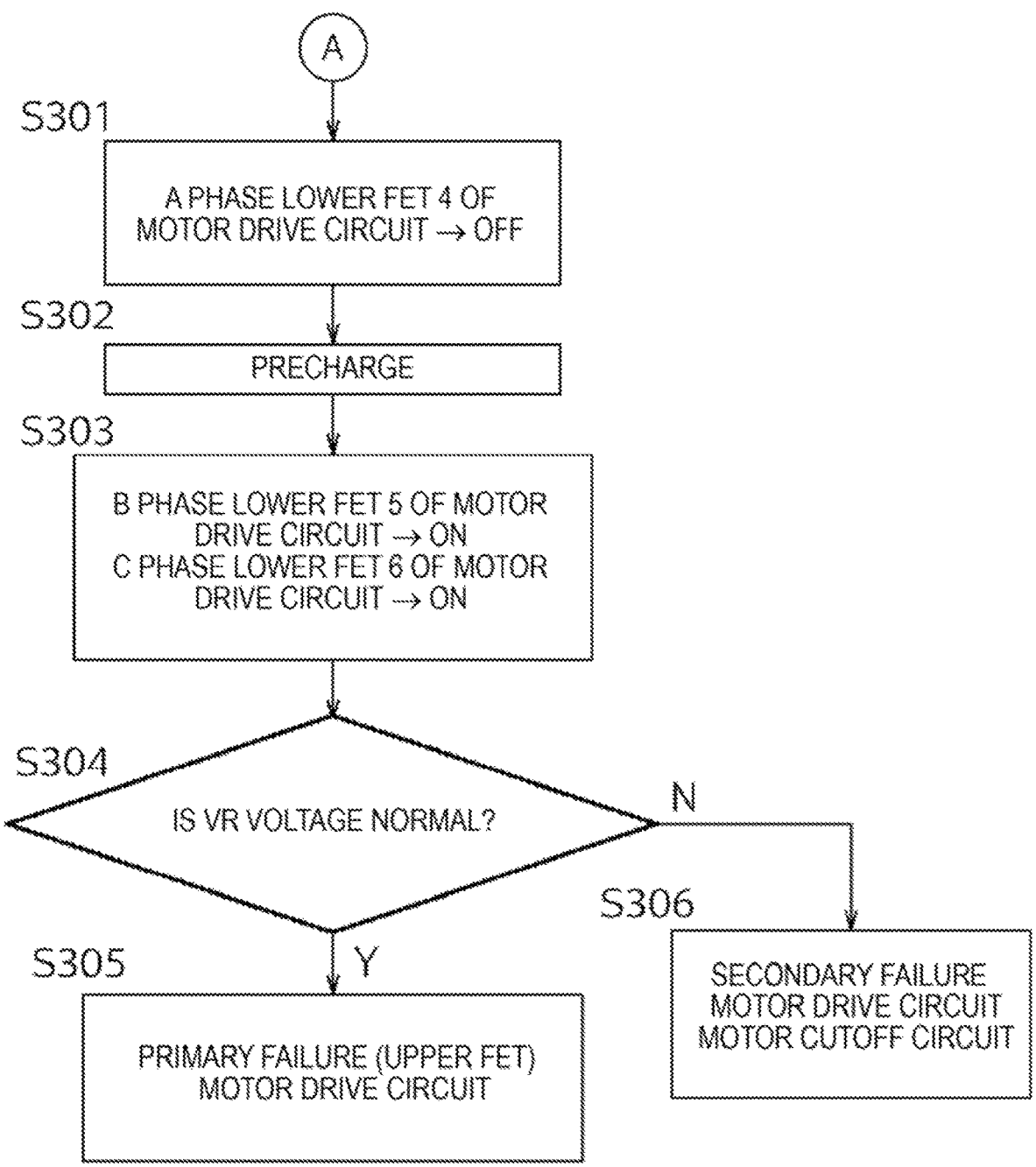
FIG. 14 is a part of a flowchart diagram for efficiently diagnosing a short-circuit failure in the failure mode B.

FIG. 14 is a part of a flowchart for efficiently diagnosing a short-circuit failure in the failure mode B and is a flowchart diagram for efficiently processing the flow of FIG. 10. If it is determined that the drive voltage VR is abnormal in step S203, the process proceeds to step S301 in FIG. 14 and the lower FET 4 is turned off.

Next, in step S302, the drive voltage VR is boosted again by the precharge circuit 13 until a predetermined voltage value is reached. The process proceeds to step S303 to turn on the lower FETs 5 and 6 at the same time, and in the next step S304, it is determined whether or not the drive voltage VR has remained normal.

At this time, if there is only a short-circuit failure in the upper FET 1, the drive voltage VR is maintained in normal, and thus the process proceeds to step S305, in which it is determined that there is a short-circuit failure only in the upper FET 1, that is, a primary failure of the motor drive circuit 10, and the lower FETs 5 and 6 are turned off to complete the process.

When the drive voltage VR becomes abnormal in step S304, the process proceeds to step S306, in which it is determined that there is a secondary failure in which short-circuit failures of the motor drive circuit 10 and the motor cutoff circuit occur at the same time to form a closed-loop circuit, and the lower FETs 5 and 6 are turned off to complete the process. At this time, the secondary failure can be detected quickly although the parts of the upper FETs and the motor cutoff FETs that have a short-circuit failure cannot be specified.

As described above, the detection method shown in FIG. 14 reduces the number of times the lower FETs 4 to 6 are turned on and off, and thus it is possible to efficiently separate a primary failure due to a short-circuit failure of only the upper FET of the motor drive circuit and a secondary failure in which a short-circuit failure of the motor drive circuit 10 and a short-circuit failure of the motor cutoff circuit occur at the same time to form a closed-loop circuit.

Although the precharge circuit 13 is used in the above-described embodiments, the precharge circuit is not necessarily required. The precharge circuit is for preventing the motor drive circuit 10 from being destroyed by a through current flowing from the drive voltage VR toward the GND through the motor drive circuit and is unnecessary if there is a means to protect the motor drive circuit.

Further, when diagnosing the short-circuit failure in the failure mode A, the voltage dividing circuit 17 is used to apply a predetermined voltage to each phase output of the motor drive circuit. However, without being limited to the voltage dividing circuit 17, other diagnostic voltage applying circuits that can apply a predetermined voltage to each phase output of the motor drive circuit at the time of diagnosis and have an output impedance higher than the shunt resistance or the winding resistance of the motor may be used.

Further, in the above-described flowchart for diagnosing the short-circuit failure in the failure mode B, first, the switching control to turn off all the FETs is performed and the drive voltage VR is boosted by the precharge circuit 13 until a predetermined voltage value is reached. After that, the abnormality detection is performed by the ON or OFF control of the lower FETs 4 to 6. However, the switching control is performed to turn on only one of the lower FETs 4 to 6, precharge is performed by the precharge circuit 13, and it may be determined to be abnormal if the drive voltage VR is not boosted even after a predetermined period has been elapsed.

Further, although a short-circuit failure in the failure mode B is detected based on the drive voltage VR, it may be detected based on the phase voltages VA, VB, and VC that are correlated with the drive voltage VR.

Further, as described above, although a short-circuit failure is detected by detecting the voltage value based on the drive voltage VR, it may be detected based on whether or not the phase current value flowing when the lower FET is turned on exceeds a predetermined value. Flowchart diagrams for diagnosing a short-circuit failure in the failure mode B based on the phase current value are shown in FIGS. 15 to 17.

Figure 15:
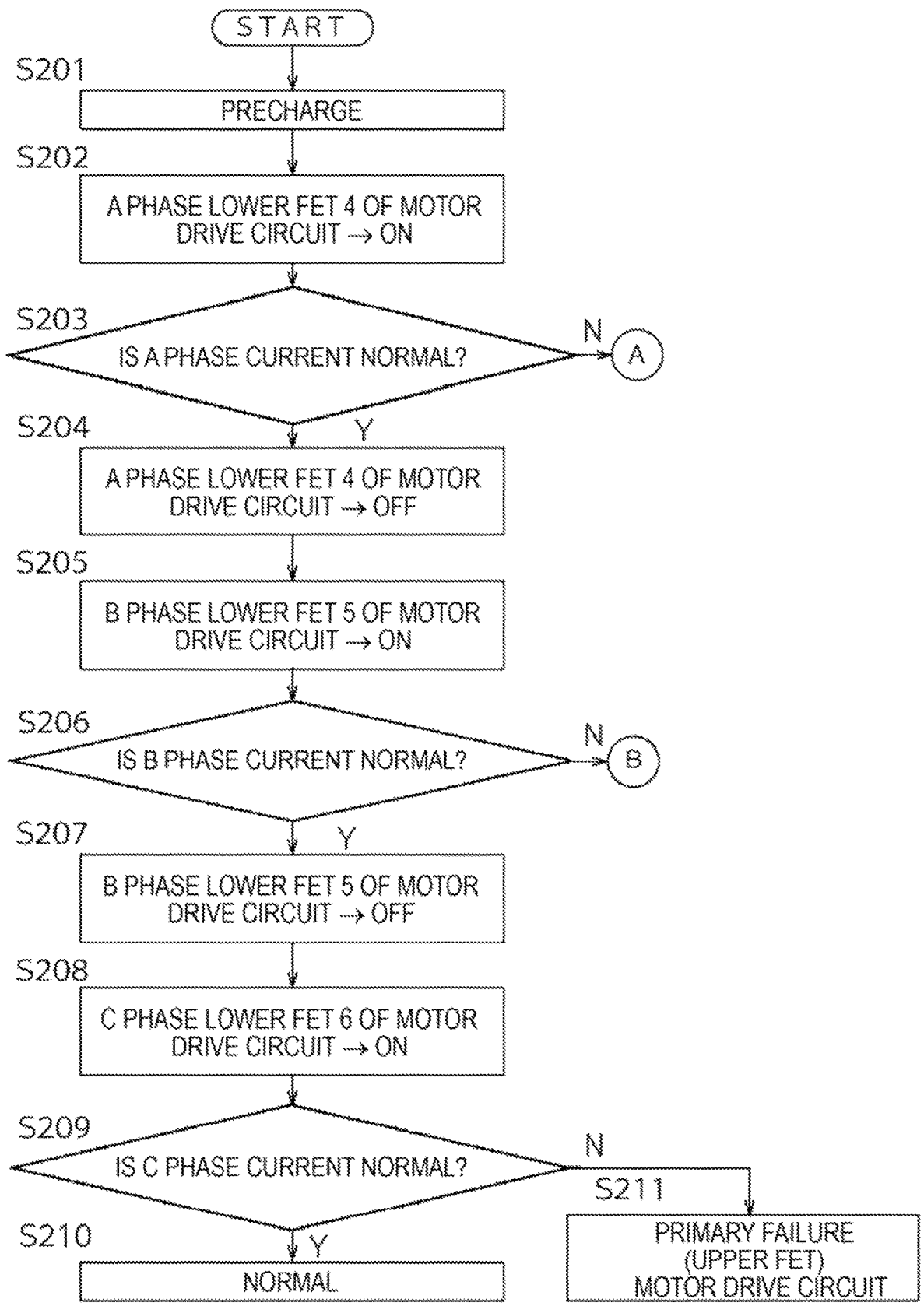
FIG. 15 is a part of a flowchart diagram for diagnosing a short-circuit failure in the failure mode B with a phase current.
Figure 16:
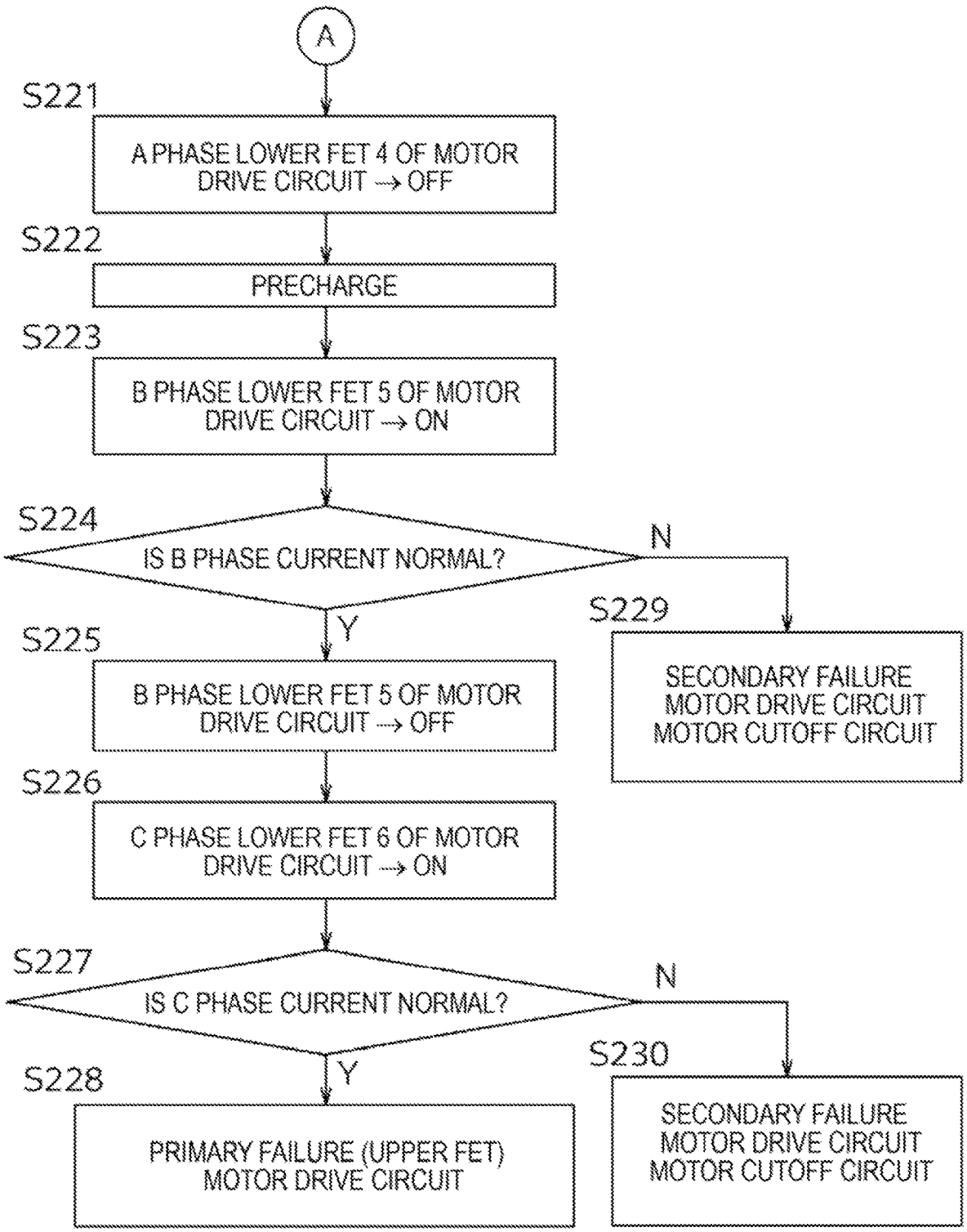
FIG. 16 is a part of a flowchart diagram for diagnosing a short-circuit failure in the failure mode B with a phase current.
Figure 17:
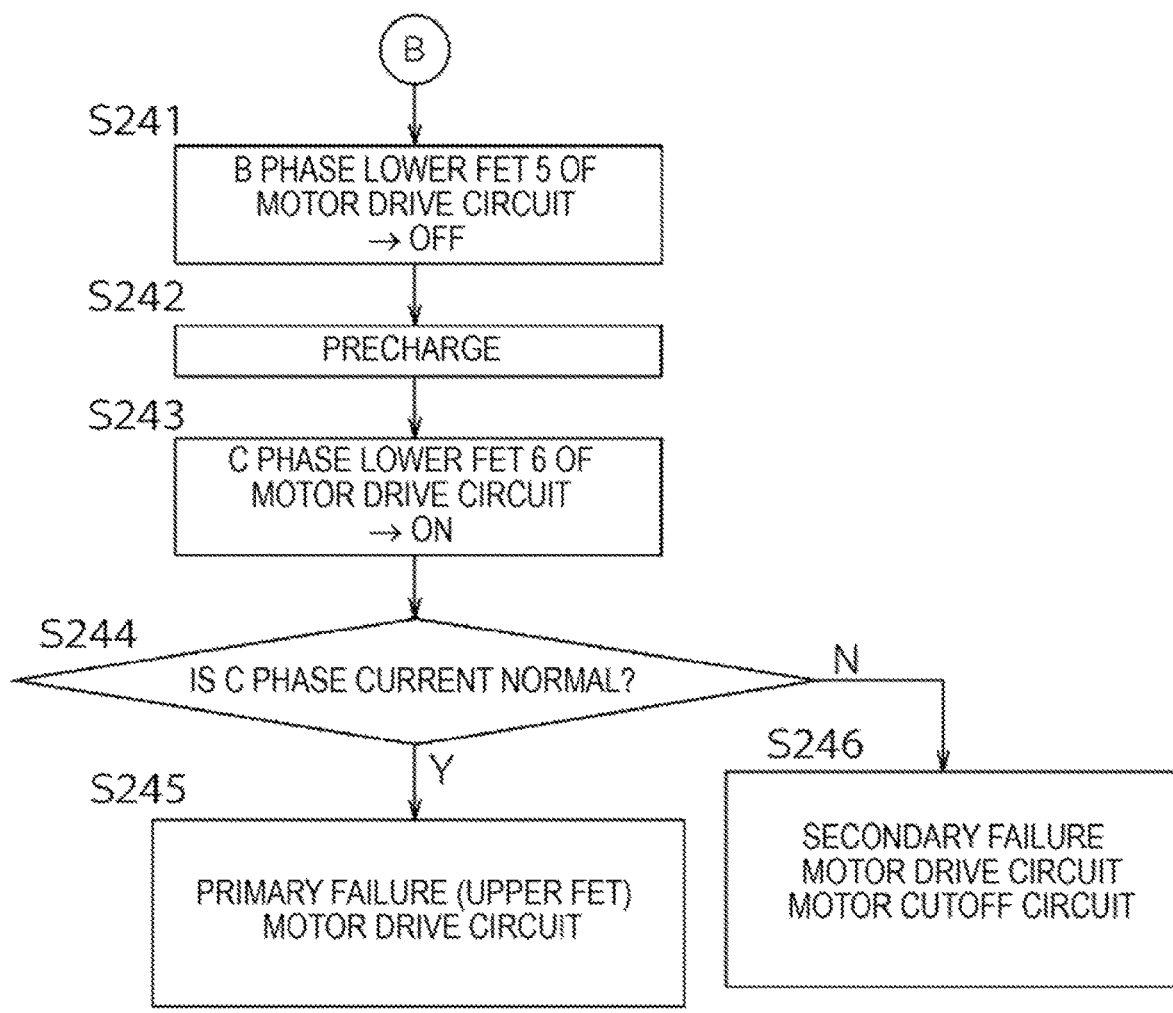
FIG. 17 is a part of a flowchart diagram for diagnosing a short-circuit failure in the failure mode B with a phase current.

In step S203 in FIGS. 15 to 17, it is determined whether or not the current value of the A phase, which is the phase current flowing when the lower FET 4 is turned on, exceeds a predetermined value. If the current value exceeds the predetermined value, this current value is abnormal, and if the current value falls below the predetermined value, this current value is normal. The normal current value corresponds to the normal drive voltage VR and the abnormal current value corresponds to the abnormal drive voltage VR.

Similarly, in steps S206 and S224, it is determined whether or not the current value of the B phase, which is the phase current flowing when the lower FET 5 is turned on, exceeds a predetermined value. In steps S209, S227, and S244, it is determined whether or not the current value of the C phase, which is the phase current flowing when the lower FET 6 is turned on, exceeds a predetermined value. The other processes in FIGS. 15 to 17 are the same as the processes in FIGS. 9 to 11 and the descriptions thereof will be omitted.

Also, the motor drive circuit is not limited to two systems and may be one system or multiple systems of three or more systems. The motor drive circuit may be a multi-phase configuration in which there are three or more upper FETs, lower FETs, and motor cutoff FETs.

Further, in the initial diagnosis after the power is turned on, the diagnosis of a short-circuit failure and a secondary failure is exemplified, but for example, if each FET can be operated, the motor terminal voltage can be detected, and the drive voltage (or phase current) can be detected, a short-circuit failure or a secondary failure may be diagnosed at another timing. For example, if it is determined that at least one of the steering torque, the steering angle, and the current command value (or the current detection value) is maintained in a small range including zero for a predetermined time even during traveling, a short-circuit failure or a secondary failure may be diagnosed as in the flowcharts of FIGS. 2, 6, 9, 10, and 11. The above-mentioned condition determines a straight traveling state in which the driver is not steering. Further, if the vehicle is stopped, the determination condition may be that at least one of the steering torque and the commanded current value (or the detected current value) is maintained in a small range including zero for a predetermined time.

Further, in the above-described embodiments, the case where the arithmetic processing unit 15 performs the diagnosis of a short-circuit failure and a secondary failure based on the voltage detection has been exemplified, but the short-circuit failure and the secondary failure may be diagnosed based on the current detection. As a result, a monitor circuit (corresponding to a voltage dividing circuit for monitoring the motor terminal voltage becomes unnecessary and the cost required for the electric power steering apparatus can be reduced.

Further, it is also possible to adopt a failure detection method in which the failure mode A detection method of the second embodiment and the failure mode B detection method of the third embodiment are continuously performed. By doing so, it is possible to perform the detection of a primary failure, which is a short-circuit failure of only the lower FETs 4 to 6 of the motor drive circuit 10, and the detection of a secondary failure forming a closed-loop circuit when any one of the lower FETs 4 to 6 has a short-circuit failure and a motor cutoff FET in the same phase as the lower FET having the short-circuit failure has a short-circuit failure, by the failure mode A detection method, and the detection of a primary failure, which is a short-circuit failure of only the upper FETs is 1 to 3 of the motor drive circuit 10, and the detection of a secondary failure forming a closed-loop circuit when any one of the upper FETs 1 to 3 has a short-circuit failure and the motor cutoff FETs 7 to 9 in a different phase from the upper FETs 1 to 3 having the short-circuit failure have a short-circuit failure, by the failure mode B detection method.

The order of succession may be reversed, and the primary failure and the secondary failure can be reliably detected by continuously performing diagnosis processes. Furthermore, the above-described continuous failure detection methods of the failure mode A and B may be employed for detecting and processing the primary failure and secondary failure of each system of the two-system electric power steering apparatus of the first embodiment.

As described above, according to the electric power steering apparatuses of the first to third embodiments, in the initial diagnosis after the power is turned on, it is possible to easily detect the occurrence of the secondary failure in which a short-circuit failure of the upper and lower FETs in the motor drive circuit 10 and a short-circuit failure of the motor cutoff FETs corresponding to the motor cutoff circuit 16 occur at the same time to form the closed-loop circuit.

In addition, it is possible to appropriately determine whether or not the assist force is applied by the motor according to the primary failure that is a short-circuit failure of only the upper FETs 1 to 3 and the lower FETs 4 to 6 of the motor drive circuit or the secondary failure forming a closed-loop circuit, thereby preventing the start of the traveling in a dangerous state.

Although various embodiments have been described above with reference to the drawings, it is needless to say that the present invention is not limited to such examples. It is obvious to those skilled in the art that various changes or modifications can be conceived within the scope described in the claims, and it will be understood that these also naturally belong to the technical scope of the present invention. Further, the constituent elements in the above-described embodiments may be arbitrarily combined without departing from the spirit of the invention.

The present application is based on three Japanese patent applications filed on Mar. 29, 2018 (Japanese Patent Application Nos. 2018-065955, 2018-065956, and 2018-065957), the contents of which are incorporated herein by reference.

REFERENCE SIGNS LIST

10, 10*a*, 10*b*: motor drive circuit
11*a*, 11*b*: power cutoff circuit
12: battery
13, 13*a*, 13*b*: precharge circuit
14*a*, 14*b* FET: drive circuit
15: arithmetic processing unit
16*a*, 16*b*: motor cutoff circuit
17*a*, 17*b*: voltage dividing circuit FET 1 to 3, FET 1*a* to 3*a*, FET 1*b* to 3*b*: upper FET
FET 4 to 6, FET 4*a* to 6*a*, FET 4*b* to 6*b*: lower FET
FET 7 to 9, FET 7*a* to 9*a*, FET 7*b* to 9*b*: motor cutoff FET
M: three-phase motor

The invention claimed is:

1. A motor control device comprising a motor and a motor drive circuit that is connected to a power supply device and the motor and controls the output of the motor, and comprising
a processing unit configured to detect a closed-loop circuit formed by the motor and the motor drive circuit based on a short-circuit failure of switching elements arranged in the motor drive circuit, wherein:
a plurality of motor control switching elements configured to drive the motor are arranged in the motor drive circuit;
a cutoff switching element that cut off the power supply to the motor is arranged on a power line connecting the motor and the motor drive circuit;
the closed-loop circuit is formed based on short-circuit failures of the motor control switching element and the cutoff switching element;
the motor control device further includes a diagnostic voltage applying circuit configured to apply a diagnostic voltage to the output of the motor drive circuit; and
the processing unit:
performs the switching control of the motor control switching element and the cutoff switching element, and
detects the closed-loop circuit based on output voltages of the motor drive circuit of each of power lines, including the power line, in a state where all of the motor control switching elements and the cutoff switching element are turned off.

2. The motor control device according to claim 1, wherein:
the motor control switching element is provided with element pairs consisting of upper switching elements arranged on the high potential side and lower switching elements arranged on the low potential side in correspondence to the power line; and
when the output voltages of the motor drive circuit of the respective power lines all show abnormal values, the processing unit determines that a secondary failure is occurred in which short-circuit failures occur in the lower switching element and the cutoff switching element in the same phase as the lower switching element at the same time to form the closed-loop circuit.

3. The motor control device according to claim 2, wherein when a plurality of output voltages, which are output voltages of the motor drive circuit of the respective power lines, include both a normal value and an abnormal value, the processing unit determines that a primary failure, which is a short-circuit failure of the lower switching element, is occurred.

4. The motor control device according to claim 3, wherein:
the motor drive circuit including the motor control switching element, the diagnostic voltage applying circuit, and the cutoff switching element are provided with a plurality of systems; and
the processing unit detects the primary failure or the secondary failure of each system based on the output voltage of the motor drive circuit of each power line of the plurality of systems.

5. The motor control device according to claim 4, wherein when at least one system of the plurality of systems is normal and only the primary failure is detected in the abnormal system, the processing unit performs assist control of the steering assist torque only with the normal system.

6. The motor control device according to claim 4, wherein when the secondary failure is detected in at least one of the plurality of systems, or when the primary failure is detected in all of the plurality of systems, the processing unit performs the control to stop all assist control of the steering assist torque.

7. The motor control device according to claim 1, wherein the processing unit starts the detection of the closed-loop circuit during an initial diagnosis after the motor control device is activated.

8. The motor control device according to claim 1, wherein the motor control device is an electric power steering apparatus.

9. The motor control device according to claim 1, wherein the motor control switching elements and the cutoff switching element are all of any switching elements configured to drive the motor.

10. The motor control device according to claim 9, wherein the processing unit is configured to determine all of the motor control switching elements and the cutoff switching element to be turned off in the state.

11. A motor control device comprising a motor and a motor drive circuit that is connected to a power supply device and the motor and controls the output of the motor, and comprising,
a processing unit configured to detect a closed-loop circuit formed by the motor and the motor drive circuit based on a short-circuit failure of switching elements arranged in the motor drive circuit, wherein:
a plurality of motor control switching elements configured to drive the motor are arranged in the motor drive circuit;
a cutoff switching element that cut off the power supply to the motor is arranged on a power line connecting the motor and the motor drive circuit;
the closed-loop circuit is formed based on short-circuit failures of the motor control switching element and the cutoff switching element;
the power supply device is capable of repeatedly charging electric power;
the motor control switching element is provided with element pairs consisting of upper switching elements arranged on the high potential side and lower switching elements arranged on the low potential side in correspondence to the power line;
the processing unit:
performs the switching control of the motor control switching element and the cutoff switching element;
performs the switching control to turn on any one as a first lower switching element, and turn off the lower switching elements other than the first lower switching element among the lower switching elements;
detects the closed-loop circuit based on the voltage value of the charged power supply device or the phase current value of the first lower switching element;
repeats the switching control to turn on and off the lower switching element in order; and
determines whether or not the voltage value of the charged power supply device or the phase current value of the turned-on lower switching element is an abnormal value to detect the closed-loop circuit, for each switching control that turns on the lower switching element; and
when the voltage value of the charged power supply device or the phase current value of the first lower switching element is an abnormal value, the processing unit determines that any one of the followings occurred,
a primary failure in which a short-circuit failure occurs only in the upper switching element in the same phase as the first lower switching element,
a secondary failure in which a short-circuit failure of the upper switching element in the same phase as the first lower switching element and a short-circuit failure of the cutoff switching element in a different phase from the first lower switching element occur to form the closed-loop circuit, and
a secondary failure in which a short-circuit failure of the upper switching element in a different phase from the first lower switching element and a short-circuit failure of the cutoff switching element in the same phase as the first lower switching element occur to form the closed-loop circuit.

12. The motor control device according to claim 11, wherein
when the switching control is performed to turn on the first lower switching element and turn off the lower switching elements other than the first lower switching element, and the voltage value of the charged power supply device or the phase current value of the first lower switching element is an abnormal value, and
when the switching control is performed to turn on any one other than the first lower switching element as a second lower switching element and turn off the lower switching elements other than the second lower switching element, and the voltage value of the recharged power supply device or the phase current value of the second lower switching element is an abnormal value,
the processing unit determines that the secondary failure is occurred.

13. The motor control device according to claim 11, wherein
when the switching control is performed to turn on the first lower switching element and turn off the lower switching elements other than the first lower switching element, and the voltage value of the charged power supply device or the phase current value of the first lower switching element is an abnormal value, and
when the switching control is performed to turn on any one other than the first lower switching element as a second lower switching element and turn off the lower switching elements other than the second lower switching element, and the voltage value of the recharged power supply device or the phase current value of the second lower switching element is a normal value,
the processing unit determines that the primary failure is occurred.

14. The motor control device according to claim 11, wherein:
the motor drive circuit and the cutoff switching element are provided with a plurality of systems; and
the processing unit detects the primary failure or the secondary failure of each system based on the voltage value of the power supply device measured in the plurality of systems or the phase current value of the first lower switching element.

15. The motor control device according to claim 14, wherein
- when at least one system of the plurality of systems is normal and only the primary failure is detected in the abnormal system, the processing unit performs assist control of the steering assist torque only with the normal system.

16. The motor control device according to claim 14, wherein
- when the secondary failure is detected in at least one of the plurality of systems, or when the primary failure is detected in all of the plurality of systems, the processing unit performs the control to stop all assist control of the steering assist torque.

17. The motor control device according to claim 11, wherein
- the processing unit starts the detection of the closed-loop circuit during an initial diagnosis after the motor control device is activated.

18. The motor control device according to claim 11, wherein
- the motor control device is an electric power steering apparatus.

\* \* \* \* \*